US011297493B2

United States Patent
Yao et al.

(10) Patent No.: US 11,297,493 B2
(45) Date of Patent: Apr. 5, 2022

(54) DATA TRANSMISSION METHOD, RELATED DEVICE, AND COMMUNICATIONS SYSTEM

(71) Applicant: Huawei Technologies Co., Ltd., Shenzhen (CN)

(72) Inventors: Chuting Yao, Beijing (CN); Haibo Xu, Beijing (CN); Jian Wang, Beijing (CN); Aimin Justin Sang, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 243 days.

(21) Appl. No.: 16/633,108

(22) PCT Filed: Aug. 3, 2017

(86) PCT No.: PCT/CN2017/095770
§ 371 (c)(1),
(2) Date: Jan. 22, 2020

(87) PCT Pub. No.: WO2019/024032
PCT Pub. Date: Feb. 7, 2019

(65) Prior Publication Data

US 2020/0374690 A1 Nov. 26, 2020

(51) Int. Cl.

| | |
|---|---|
| ***H04W 12/03*** | (2021.01) |
| ***H04W 76/27*** | (2018.01) |
| ***H04W 36/00*** | (2009.01) |
| ***H04W 36/08*** | (2009.01) |

(52) U.S. Cl.
CPC ....... *H04W 12/03* (2021.01); *H04W 36/0033* (2013.01); *H04W 36/0069* (2018.08); *H04W 36/08* (2013.01); *H04W 76/27* (2018.02)

(58) Field of Classification Search
CPC ............... H04W 12/041; H04W 12/04; H04W 36/0038; H04W 12/033; H04W 36/08; H04W 12/06; H04W 12/08; H04W 36/0033; H04W 12/03; H04W 12/0471; H04W 76/27; H04W 36/0069; H04W 12/73; H04W 36/0066
See application file for complete search history.

(56) References Cited

U.S. PATENT DOCUMENTS

| | | | | |
|---|---|---|---|---|
| 8,671,451 | B1 * | 3/2014 | Lambert | H04W 12/08 726/25 |
| 2008/0310367 | A1 | 12/2008 | Meylan | |
| 2012/0177002 | A1 | 7/2012 | Faucher et al. | |
| 2013/0016841 | A1 | 1/2013 | Fong et al. | |
| 2017/0215225 | A1 | 7/2017 | Yi et al. | |

(Continued)

FOREIGN PATENT DOCUMENTS

| | | | |
|---|---|---|---|
| CN | 102823181 | A | 12/2012 |
| CN | 103314615 | A | 9/2013 |

(Continued)

*Primary Examiner* — Allahyar Kasraian
(74) *Attorney, Agent, or Firm* — Conley Rose, P.C.

(57) ABSTRACT

A method includes sending, by an access network device, first indication information to a terminal device, where the first indication information indicates a last packet in one or more first-type packets or a first packet in one or more second-type packets, where the first-type packet is enciphered using a first cipher key, and the second-type packet is enciphered using a second cipher key.

20 Claims, 19 Drawing Sheets

Access network device

Terminal device

S301: Send first indication information, where the first indication information is used to indicate a last packet in one or more first-type packets or a first packet in one or more second-type packets S302: Determine that a received packet is the first-type packet or the second-type packet based on the first indication information

(56) References Cited

U.S. PATENT DOCUMENTS

| | | | | |
|---|---|---|---|---|
| 2017/0220699 | A1* | 8/2017 | Luo | G06F 3/061 |
| 2018/0041927 | A1* | 2/2018 | Raval | H04W 24/02 |
| 2018/0287820 | A1* | 10/2018 | Mayer-Wolf | H04L 49/3009 |
| 2018/0324160 | A1* | 11/2018 | Axen | H04W 12/08 |
| 2019/0174307 | A1* | 6/2019 | Wang | H04L 9/0891 |
| 2020/0120492 | A1* | 4/2020 | Xu | H04W 12/69 |

FOREIGN PATENT DOCUMENTS

| | | | |
|---|---|---|---|
| CN | 104821859 | A | 8/2015 |
| CN | 106537882 | A | 3/2017 |
| CN | 107438274 | A | 12/2017 |
| EP | 2003839 | A1 | 12/2008 |
| WO | 2016042766 | A1 | 3/2016 |
| WO | 2016195735 | A1 | 12/2016 |

* cited by examiner

DATA TRANSMISSION METHOD, RELATED DEVICE, AND COMMUNICATIONS SYSTEM

CROSS-REFERENCE TO RELATED APPLICATIONS

This application is a U.S. National Stage of International Patent Application No. PCT/CN2017/095770 filed on Aug. 3, 2017, which is hereby incorporated by reference in its entirety.

TECHNICAL FIELD

Embodiments of the present invention relate to the field of communications technologies, and in particular, to a data transmission method, a related device, and a communications system.

BACKGROUND

In fifth-generation (the fifth generation, 5G) mobile communication, a requirement raised for a handover (Handover, HO) delay is 0 ms. That is, in a handover process, a terminal device is handed over between a source access network device and a target access network device without a transmission interruption. To achieve a real 0 ms interruption, the terminal device needs to be connectable to the source access network device and the target access network device at the same time. This function can be implemented through dual connectivity (Dual Connectivity, DC), that is, the terminal device is connected to the two access network devices at the same time. Radio bearers included in DC are classified into three types: a master cell group bearer (Master Cell Group Bearer, MCG Bearer), a secondary cell group bearer (Secondary Cell Group Bearer, SCG Bearer), and a split bearer (Split Bearer). The master cell group bearer and the secondary cell group bearer respectively indicate a radio bearer that is transmitted only through a master access network device (Master next-generation Node B, MgNB) and a radio bearer that is transmitted only through a secondary access network device (Secondary next-generation Node B, SgNB). The split bearer may achieve transmitting a same radio bearer through two access network devices. Referring to a schematic architectural diagram of a layer 2 protocol stack shown in FIG. 1, downlink data of the split bearer is processed by a packet data convergence protocol (Packet Data Convergence Protocol, PDCP) entity of the master access network device. Some PDCP protocol data units (Protocol Data Unit, PDU) are transmitted to the terminal device through a radio link layer control protocol (Radio Link Control, RLC) entity, a Media Access Control (Media Access Control, MAC) entity, and a physical layer (Physical Layer, PHY) entity of the master access network device. Other PDCP PDUs arrive at the secondary access network device through an X2 interface between the master access network device and the secondary access network device, and are transmitted to the terminal device through RLC, MAC, and PHY entities of the secondary access network device.

Transmitting data of a same bearer through two paths to the terminal device can be implemented by using the split bearer in DC. With regard to a requirement for a 0 ms HO delay, an HO process in new radio (New Radio, NR) may be implemented through three steps: Step 1: Add a target access network device (Target gNB) as a secondary access network device of a source access network device (Source gNB). Step 2: Exchange roles of the master access network device (that is, the source access network device) and the secondary access network device (that is, the target access network device) (that is, exchanging functions, to enable the target access network device to serve as the master access network device and the source access network device to serve as the secondary access network device). Step 3: Remove the secondary access network device (that is, the source access network device).

Before the source access network device and the target access network device exchange roles, all packets are enciphered by the PDCP entity of the master access network device, that is, the source access network device, and are transmitted by the source access network device and the target access network device through the split bearer. When the two exchange roles, there are packets enciphered by the source access network device in the PDCP, RLC, and MAC entities of the source access network device and the RLC and MAC entities of the target access network device. After the roles are exchanged, the PDCP entity of the target access network device starts to encipher data, and the enciphered data is transmitted by the source access network device and the target access network device through the split bearer. In addition, because of the requirement for a 0 ms HO delay, reconstruction or resetting of the layer 2 protocol stack should be prevented during the role exchange in step 2. Therefore, the terminal device does not learn of when a switchover between the master access network device and the secondary access network device occurs after a Radio Resource Control (Radio Resource Control, RRC) reconfiguration message is received. Packets at an air interface are out of order when arriving at an RLC entity of the terminal device, and an RLC entity in NR cannot ensure that the packets are orderly submitted to a PDCP entity. Consequently, the packets that are submitted by the RLC entity of the terminal device and that are received by the PDCP entity of the terminal device are out of order. Some packets enciphered by the target access network device may arrive at the RLC entity prior to packets enciphered by the source access network device before the role exchange. As a result, the terminal device cannot learn of which packets are enciphered by using a key of the source access network device and which packets are enciphered by using a key of the target access network device, and consequently, cannot correctly decipher the packets.

SUMMARY

Embodiments of the present invention provide a data transmission method, a related device, and a communications system, so that it can be ensured that a terminal device can decipher a packet by using a correct key after a source access network device and a target access network device exchange roles (that is, the source access network device is switched from a master access network device to a secondary access network device, and the target access network device is switched from a secondary access network device to a master access network device).

The embodiments of the present invention may be specifically implemented through the following technical solutions:

According to a first aspect, an embodiment of the present invention provides a data transmission method, where the method is applied to an access network device side. The method includes: sending, by an access network device, first indication information to a terminal device, where the first indication information is used to indicate a last packet in one or more first-type packets or a first packet in one or more second-type packets, the first-type packet is enciphered by using a first cipher key, and the second-type packet is enciphered by using a second cipher key. Through implementation of this embodiment of the present invention, the access network device sends the first indication information to the terminal device, so that it can be ensured that after a source access network device and a target access network device exchange roles, the terminal device can identify whether a received packet is a first-type packet or a second-type packet based on the first indication information, and further, can decipher the packet by using a correct key.

In a possible design, the first indication information includes at least one type of the following information: a number corresponding to the last packet in the first-type packets, a number corresponding to the first packet in the second-type packets, a difference between the number corresponding to the last packet in the first-type packets and an offset, and a difference between the number corresponding to the first packet in the second-type packets and an offset.

In a possible design, the foregoing number includes a sequence number or a count.

In a possible design, after the access network device sends the first indication information to the terminal device, after receiving an acknowledgment message of the first indication information sent by the terminal device, the access network device sends the second-type packet to the terminal device. Through implementation of this embodiment of the present invention, it can be ensured that before receiving the first indication information, the terminal device cannot receive a second-type packet. Therefore, before receiving the first indication information, the terminal device may continue correctly deciphering a received packet by using the first cipher key.

In a possible design, the sending, by an access network device, first indication information to a terminal device includes: after sending all the first-type packets to the terminal device, sending, by the access network device, the first indication information to the terminal device.

In a possible design, the access network device is a first access network device, the first-type packet is obtained by the first access network device through enciphering by using the first cipher key, and the second-type packet is obtained by the second access network device through enciphering by using the second cipher key; and after receiving the acknowledgment message of the first indication information sent by the terminal device, sending, by the first access network device, second indication information to the second access network device, where the second indication information is used to instruct the second access network device to send the second-type packet.

In a possible design, the first indication information is carried in a data protocol data unit or a control protocol data unit; or the sending, by an access network device, first indication information to a terminal device includes: sending, by the access network device, the first indication information to the terminal device by using a data protocol data unit or a control protocol data unit.

In a possible design, the data protocol data unit includes third indication information, the third indication information is used to indicate that the first indication information is carried in the data protocol data unit, and a number of the data protocol data unit is the number indicated by the first indication information.

According to a second aspect, an embodiment of the present invention provides another data transmission method, where the method is applied to a terminal device side. The method includes: receiving, by a terminal device, first indication information sent by an access network device, where the first indication information is used to indicate a last packet in one or more first-type packets and a first packet in one or more second-type packets, the first-type packet is enciphered by using a first cipher key, and the second-type packet is enciphered by using a second cipher key; and determining, by the terminal device, whether a received packet is the first-type packet or the second-type packet based on the first indication information. Through implementation of this embodiment of the present invention, it can be ensured that after a source access network device and a target access network device exchange roles, the terminal device can identify whether a received packet is a first-type packet or a second-type packet based on the first indication information, and further, can decipher the packet by using a correct key.

In a possible design, the first indication information includes at least one type of the following information: a number corresponding to the last packet in the first-type packets, a number corresponding to the first packet in the second-type packets, a difference between the number corresponding to the last packet in the first-type packets and an offset, and a difference between the number corresponding to the first packet in the second-type packets and an offset.

In a possible design, after the receiving, by a terminal device, first indication information sent by an access network device, the method further includes: sending, by the terminal device, an acknowledgment message of the first indication information to the access network device.

In a possible design, the acknowledgment message is indicated by the terminal device by using a packet data convergence protocol state report or is sent by the terminal device by using a control protocol data unit of the packet data convergence protocol, and the control protocol data unit carries the number indicated by the first indication information.

In a possible design, the first indication information is carried in a data protocol data unit or a control protocol data unit.

In a possible design, the data protocol data unit further carries third indication information, the third indication information is used to indicate that the first indication information is carried in the data protocol data unit, and a number of the data protocol data unit is the number indicated by the first indication information.

According to a third aspect, an embodiment of the present invention provides another data transmission method, where the method is applied to an access network device side. The method includes: sending, by an access network device, fourth indication information to a terminal device, where the fourth indication information is used to indicate that a packet received before the fourth indication information is a first-type packet, a packet received after the fourth indication information is a second-type packet, the first-type packet is obtained through enciphering by using a first cipher key, and the second-type packet is obtained through enciphering by using a second cipher key. Through implementation of this embodiment of the present invention, the access network device sends the first indication information to the terminal device, so that it can be ensured that after a source access network device and a target access network device exchange roles, the terminal device can identify whether a received packet is a first-type packet or a second-type packet based on the fourth indication information, and further, can decipher the packet by using a correct key.

In a possible design, a radio link layer control protocol entity of the terminal device has a reordering function.

In a possible design, before the access network device sends the fourth indication information to the terminal device, the access network device sends a Radio Resource Control reconfiguration message to the terminal device, where the Radio Resource Control reconfiguration message is used to instruct the terminal device to enable the reordering function of the radio link layer control protocol entity.

In a possible design, the fourth indication information is carried in a data protocol data unit or a control protocol data unit.

According to a fourth aspect, an embodiment of the present invention provides another data transmission method, where the method is applied to a terminal device side. The method includes: receiving, by a terminal device, fourth indication information sent by an access network device, where the fourth indication information is used to indicate that a packet received before the fourth indication information is a first-type packet, a packet received after the fourth indication information is a second-type packet, the first-type packet is obtained through enciphering by using a first cipher key, and the second-type packet is obtained through enciphering by using a second cipher key; and determining, by the terminal device, whether a received packet is the first-type packet or the second-type packet based on the fourth indication information. Through implementation of this embodiment of the present invention, it can be ensured that after a source access network device and a target access network device exchange roles, the terminal device can identify whether a received packet is a first-type packet or a second-type packet based on the fourth indication information, and further, can decipher the packet by using a correct key.

In a possible design, a radio link layer control protocol entity of the terminal device has a reordering function.

In a possible design, before the terminal device receives the fourth indication information sent by the access network device, the terminal device receives a Radio Resource Control reconfiguration message sent by the access network device; and the terminal device enables the reordering function of the radio link layer control protocol entity based on the Radio Resource Control reconfiguration message.

In a possible design, the fourth indication information is carried in a data protocol data unit or a control protocol data unit.

According to a fifth aspect, an embodiment of the present invention provides an access network device. The access network device includes a module or a unit configured to perform the data transmission method provided in the first aspect or any possible implementation of the first aspect, and therefore, can also achieve beneficial effects possessed by the data transmission method according to the first aspect.

According to a sixth aspect, an embodiment of the present invention provides a terminal device. The terminal device includes a module or a unit configured to perform the data transmission method provided in the second aspect or any possible implementation of the second aspect, and therefore, can also achieve beneficial effects possessed by the data transmission method according to the second aspect.

According to a seventh aspect, an embodiment of the present invention provides another access network device. The access network device includes a module or a unit configured to perform the data transmission method provided in the third aspect or any possible implementation of the third aspect, and therefore, can also achieve beneficial effects possessed by the data transmission method according to the third aspect.

According to an eighth aspect, an embodiment of the present invention provides another terminal device. The terminal device includes a module or a unit configured to perform the data transmission method provided in the fourth aspect or any possible implementation of the fourth aspect, and therefore, can also achieve beneficial effects possessed by the data transmission method according to the fourth aspect.

According to a ninth aspect, an embodiment of the present invention provides another access network device. The access network device includes a processor, a transmitter, and a memory. The processor is configured to invoke data transmission program code stored in the memory to perform the data transmission method provided in the first aspect or any possible implementation of the first aspect.

According to a tenth aspect, an embodiment of the present invention provides another terminal device. The terminal device includes a processor, a receiver, and a memory. The processor is configured to invoke data transmission program code stored in the memory to perform the data transmission method provided in the second aspect or any possible implementation of the second aspect.

According to an eleventh aspect, an embodiment of the present invention provides another access network device. The access network device includes a processor, a transmitter, and a memory. The processor is configured to invoke data transmission program code stored in the memory to perform the data transmission method provided in the third aspect or any possible implementation of the third aspect.

According to a twelfth aspect, an embodiment of the present invention provides another terminal device. The access network device includes a processor, a receiver, and a memory. The processor is configured to invoke data transmission program code stored in the memory to perform the data transmission method provided in the fourth aspect or any possible implementation of the fourth aspect.

According to a thirteenth aspect, an embodiment of the present invention further provides a communications system, including: an access network device and a terminal device. The access network device is the access network device according to the fifth aspect or the ninth aspect, and the terminal device is the terminal device according to the sixth aspect or the tenth aspect. Alternatively, the access network device is the access network device according to the seventh aspect or the eleventh aspect, and the terminal device is the terminal device according to the eighth aspect or the twelfth aspect.

According to a fourteenth aspect, an embodiment of the present invention provides a chip system. The chip system includes a processor, configured to support a data sending device to implement functions included in the foregoing aspects, for example, generating or processing information in the foregoing methods. In a possible design, the chip system further includes a memory, where the memory is configured to store a necessary program instruction and necessary data of the data sending device. The chip system may be formed by a chip or may include a chip and another discrete device.

According to a fifteenth aspect, an embodiment of the present invention provides a computer storage medium, configured to store a computer software instruction used by the access network device according to the first aspect, where when executed by the access network device, the instruction enables the access network device to perform the method according to the first aspect.

According to a sixteenth aspect, an embodiment of the present invention provides another computer storage medium, configured to store a computer software instruction used by the terminal device according to the second aspect, where when executed by the terminal device, the instruction enables the terminal device to perform the method according to the second aspect.

According to a seventeenth aspect, an embodiment of the present invention provides a computer storage medium, configured to store a computer software instruction used by the access network device according to the third aspect, where when executed by the access network device, the instruction enables the access network device to perform the method according to the third aspect.

According to an eighteenth aspect, an embodiment of the present invention provides another computer storage medium, configured to store a computer software instruction used by the terminal device according to the fourth aspect, where when executed by the terminal device, the instruction enables the terminal device to perform the method according to the fourth aspect.

According to a nineteenth aspect, an embodiment of the present invention provides a computer program. The program includes a computer software instruction, where when executed by the access network device, the instruction enables the access network device to perform the method according to the first aspect.

According to a twentieth aspect, an embodiment of the present invention provides another computer program. The program includes a computer software instruction, where when executed by the terminal device, the instruction enables the terminal device to perform the method according to the second aspect.

According to a twenty-first aspect, an embodiment of the present invention provides another computer program. The program includes a computer software instruction, where when executed by the access network device, the instruction enables the access network device to perform the method according to the third aspect.

According to a twenty-second aspect, an embodiment of the present invention provides another computer program. The program includes a computer software instruction, where when executed by the terminal device, the instruction enables the terminal device to perform the method according to the fourth aspect.

DESCRIPTION OF EMBODIMENTS

Figure 1:
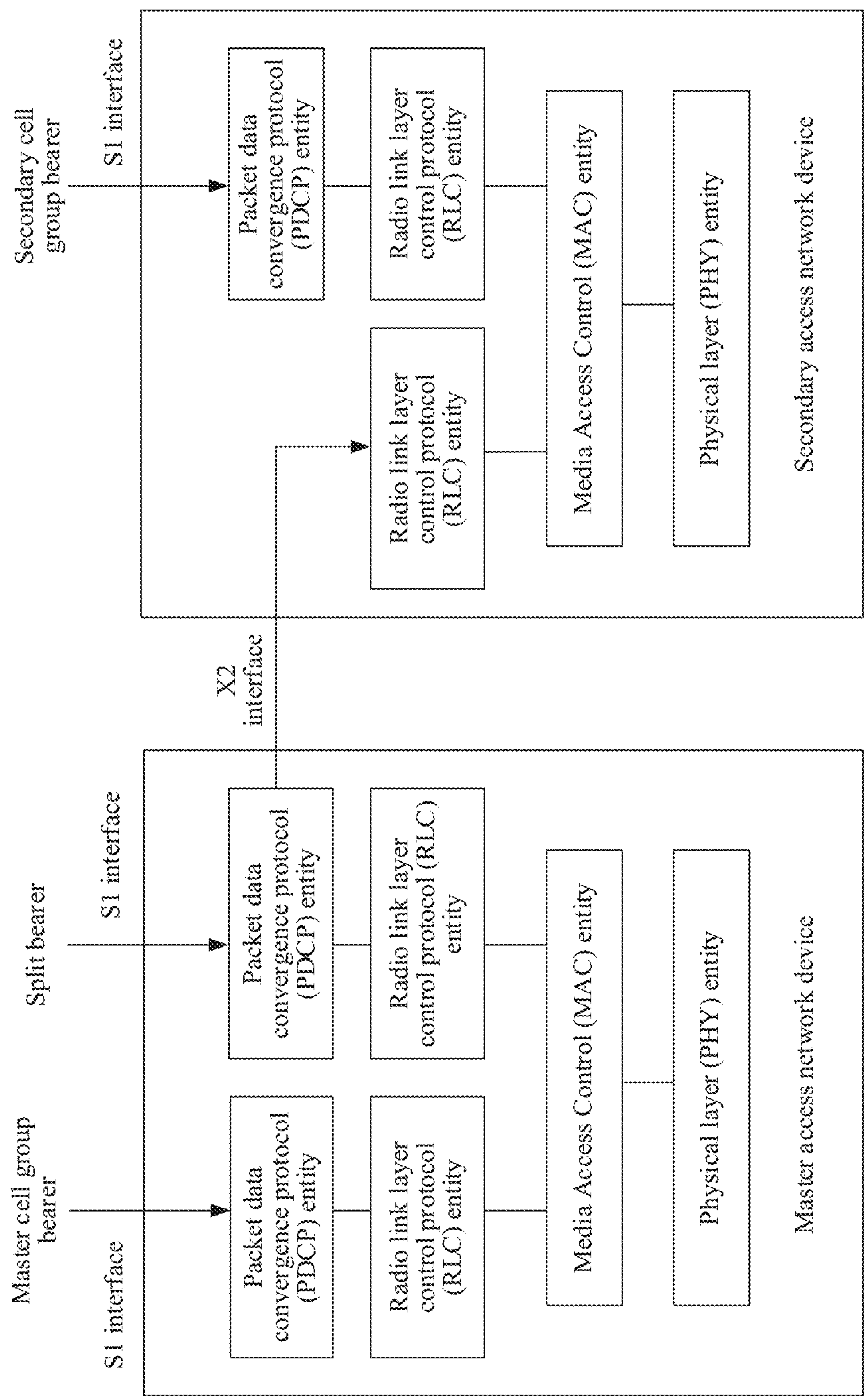
FIG. 1 is a schematic architectural diagram of a layer 2 protocol stack.
Figure 2:
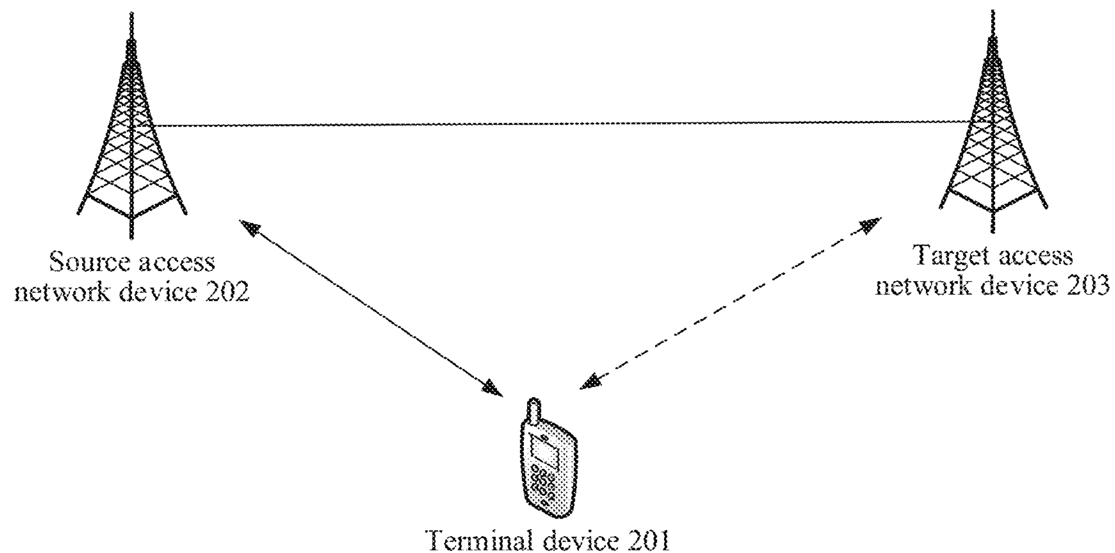
FIG. 2 is a schematic architectural diagram of a communications system included in an embodiment of the present invention.

FIG. 2 is a schematic architectural diagram of a communications system included in an embodiment of the present invention. The communications system 200 includes a terminal device 201, a source access network device 202, and a target access network device 203. Before the source access network device 202 and the target access network device 203 exchange roles, the source access network device 202 is a master access network device, and the target access network device 203 is a secondary access network device. One or more packets from a user plane of a core network are all enciphered by a PDCP entity of the source access network device 202, and are transmitted by the source access network device 202 and the target access network device 203 to the terminal device 201 through a split bearer. Specifically, the source access network device 202 sends some packets of the packets in the split bearer to the terminal device 201 through the PDCP entity, an RLC entity, a MAC entity, and a PHY entity of the source access network device 202. The source access network device 202 forwards other packets of the packets in the split bearer to the target access network device 203, and then, the packets are sent to the terminal device 201 through an RLC entity, a MAC entity, and a PHY entity of the target access network device 203.

After roles are exchanged, a PDCP entity of the target access network device 203 starts to encipher data, and the data is transmitted by the source access network device 202 and the target access network device 203 through the split bearer.

The terminal device and the access network device may perform data communication. The terminal device may also be referred to as user equipment, a mobile, an access terminal, a subscriber unit, a subscriber station, a mobile station, a remote station, a remote terminal, a mobile device, a user terminal, a terminal, a wireless communications device, a user agent, a user apparatus, or the like. The terminal device may be a handheld terminal device, a notebook computer, a subscriber unit (Subscriber Unit), a cellular phone (Cellular Phone), a smartphone (Smart Phone), a wireless data card, a personal digital assistant (Personal Digital Assistant, PDA), a handheld device having a wireless communication function, an in-vehicle device, a wearable device, a mobile in a future 5G network, or a terminal device in a future evolved public land mobile network (Public Land Mobile Network, PLMN). The terminal device and the access network device communicate with each other by using a specific air interface technology.

The access network device is mainly responsible for functions, such as radio resource management, quality of service (Quality of Service, QoS) management, data compression, and enciphering, on an air interface side. The access network device may include access network devices in various forms such as a macro access network device, a micro access network device (also referred to as a small cell), a relay station, and an access point. A device having an access network device may have different names in systems using different radio access technologies. For example, the device is referred to as a next-generation node (next-generation Node B, gNB) in a 5G communications system; the device is referred to as an evolved NodeB (evolved NodeB, eNB or eNodeB) in an LTE system; and the device is referred to as a nodeB (Node B) or the like in a third-generation (3rd Generation, 3G) system. In a future communications system, the access network device may further have another name, for example, a base station. This is not specifically limited in this embodiment of the present invention.

Figure 3:
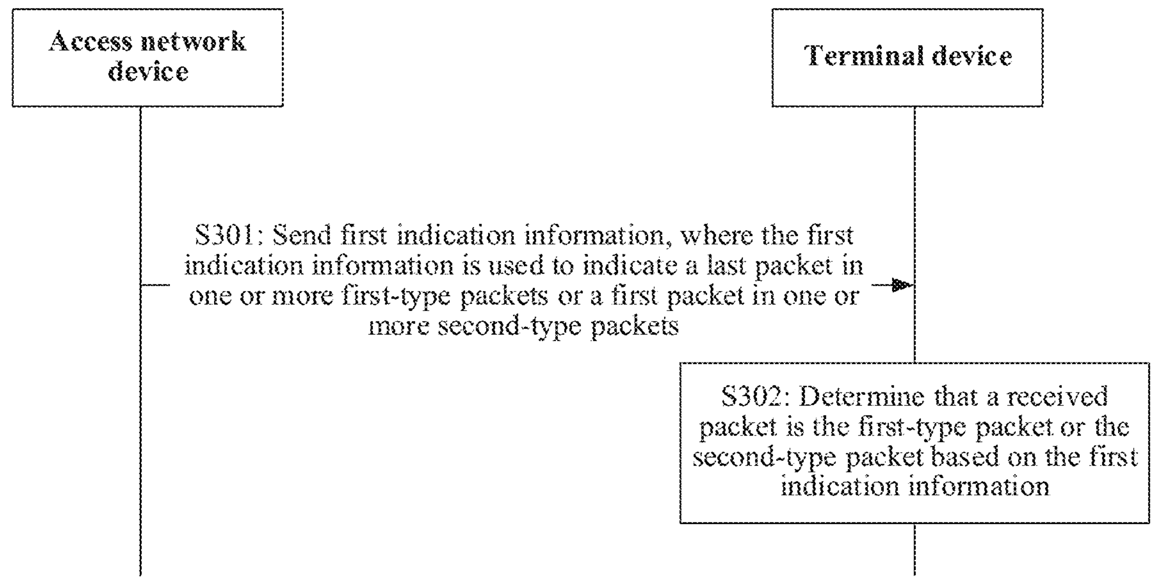
FIG. 3 is a schematic flowchart of a data transmission method according to an embodiment of the present invention.

Based on a network architecture shown in FIG. 2, a data transmission method provided in this embodiment of the present invention is described with reference to FIG. 3. As shown in FIG. 3, the data transmission method includes, but is not limited to, the following steps S301 to S302:

S301: An access network device sends first indication information to a terminal device, where the first indication information is used to indicate a last packet in one or more first-type packets or a first packet in one or more second-type packets.

In this embodiment of the present invention, the first-type packet is enciphered by using a first cipher key, and the second-type packet is enciphered by using a second cipher key. In addition, the first cipher key is different from the second cipher key. The first-type packet is obtained by the source access network device through enciphering by using the first cipher key, and the second-type packet is obtained by the target access network device through enciphering by using the second cipher key. Herein, initially, the source access network device serves as a master access network device, and the target access network device serves as a secondary access network device. Then, the master and secondary access network devices exchange roles, that is, the target access network device becomes a master access network device, and the source access network device becomes a secondary access network device. Optionally, the first indication information includes at least one type of the following information: a number corresponding to the last packet in the first-type packets, a difference between the number corresponding to the last packet in the first-type packets and an offset, a number corresponding to the first packet in the second-type packets, and a difference between the number corresponding to the first packet in the second-type packets and an offset. The number may be a sequence number (sequence number, SN) of a packet or may be a count (COUNT) corresponding to a packet. It should be noted that COUNT=hyper frame number (Hyper Frame Number, HFN)+SN. Herein, a COUNT may be a 32-bit variable. A COUNT corresponds to an SN number. If an SN is 18 bits, lower 18 bits of a COUNT are the SN. If an SN is 12 bits, lower 12 bits of a COUNT are the SN. For example, if a COUNT is 32 bits, lower 12 bits of the COUNT are an SN. The terminal device and the access network device both maintain HFN values, and the HFN value maintained by the terminal device is equal to the HFN value maintained by the access network device. Using an SN being 12 bits as an example, assuming that an SN number carried by a first packet is 3, that is, 000000000011, a COUNT value corresponding to the first packet is 00000000000000000000000000000011. An SN number carried by a 4099$^{th}$ packet is also 3, that is, 000000000011, but a COUNT value corresponding to the 4099$^{th}$ packet is 00000000000000000001000000000011. It can be learned that although SN numbers of the third packet and the 4099$^{th}$ packet are the same, COUNT values are different. An SN value is re-counted every 4096 packets.

If the first indication information sent by the access network device is an SN number corresponding to the last packet in the first-type packets, the terminal device may directly learn of the SN number corresponding to the last packet in the first-type packets based on the first indication information. If the first indication information sent by the access network device is an SN number corresponding to the first packet in the second-type packets, the terminal device may directly learn of the SN number corresponding to the first packet in the second-type packets based on the first indication information. If the first indication information sent by the access network device is a count corresponding to the last packet in the first-type packets, the terminal device may directly learn of the count corresponding to the last packet in the first-type packets based on the first indication information. If the first indication information sent by the access network device is a count corresponding to the first packet in the second-type packets, the terminal device may directly learn of the count corresponding to the first packet in the second-type packets based on the first indication information. If the terminal device and the access network device pre-negotiate an offset, the access network device sends a difference between an SN number corresponding to the last packet in the first-type packets and the offset to the terminal device, and the terminal device may calculate the SN number corresponding to the last packet in the first-type packets based on the difference and the offset. Alternatively, the access network device sends a difference between a count corresponding to the last packet in the first-type packets and the offset to the terminal device, and the terminal device may calculate the count corresponding to the last packet in the first-type packets based on the difference and the offset. Alternatively, the access network device sends a difference between an SN number corresponding to the first packet in the second-type packets and an offset to the terminal device, and the terminal device may calculate the SN number corresponding to the first packet in the second-type packets based on the difference and the offset. Alternatively, the access network device sends a difference between a count corresponding to the first packet in the second-type packets and an offset to the terminal device, and the terminal device may calculate the count corresponding to the first packet in the second-type packets based on the difference and the offset. It should be noted that regardless of which one of the foregoing cases the first indication information received by the terminal device is, the terminal device can calculate a COUNT value corresponding to the last packet in the first-type packets, or the terminal device can calculate a COUNT value corresponding to the first packet in the second-type packets. After receiving a packet carrying an SN number, the terminal device can also calculate a COUNT value corresponding to the packet based on the SN number carried by the packet and COUNT=HFN+SN.

For example, packets whose SN numbers are respectively No. 1 to No. 5 are first-type packets, and packets whose SN numbers are respectively No. 6 to No. 8 are second-type packets. The first indication information may be an SN number, 5, corresponding to a last packet in the first-type packets, and the terminal device can learn of, based on the first indication information, that the SN number corresponding to the last packet in the first-type packets is 5. Alternatively, the first indication information may be an SN number, 6, corresponding to a first packet in the second-type packets, and the terminal device can learn of, based on the first indication information, that the SN number corresponding to the first packet in the second-type packets is 6. Alternatively, an SN number offset is 3, and the first indication information may be a difference, 2, between the SN number, 5, corresponding to the last packet in the first-type packets and the offset, 3. The terminal device further calculates the SN number, 5, corresponding to the last packet in the first-type packets based on the difference, 2, and the offset, 3. Alternatively, the first indication information is a difference, 3, between the SN number, 6, corresponding to the first packet in the second-type packets and the offset, 3. The terminal device further calculates the SN number, 6, corresponding to the first packet in the second-type packets based on the difference, 3, and the offset, 3.

Optionally, after the sending, by an access network device, first indication information to a terminal device, the method further includes: after receiving an acknowledgment (Acknowledgement, ACK) message of the first indication information sent by the terminal device, sending, by the access network device, the second-type packet to the terminal device. Herein, to ensure that the first indication information arrives at a PDCP entity of the terminal device before the second-type packets, that is, times at which the No. 6 packet and a subsequent packet are submitted by an RLC entity of the terminal device to the PDCP entity of the terminal device are later than the first indication information, the access network device does not send a second-type packet to the terminal device before receiving an ACK message of the first indication information. Only after the ACK message of the first indication information sent by the terminal device is received, the second-type packets are sent to the terminal device. In this case, the first indication information needs to carry information related to an SN or a COUNT of a split point between enciphering by using an old key and enciphering by using a new key on the PDCP entity, that is, the No. 5 packet is the last packet enciphered by using the old key, or the No. 6 packet is the first packet enciphered by using the new key. For information included in the first indication information, refer to content of the preceding paragraph. Details are not described herein again. It should be noted that in this embodiment of the present invention, the key of the source access network device, the old key, and the first cipher key indicate a same meaning, and the key of the target access network device, the new key, and the second cipher key indicate a same meaning.

Optionally, the access network device described in step S301 may be a source access network device or a target access network device. Descriptions are provided below with respect to the two implementations respectively.

In a first implementation, the access network device that sends the first indication information is a target access network device. Before the target access network device is switched from a secondary access network device to a master access network device, and the source access network device is switched from a master access network device to a secondary access network device, a PDCP entity of the split bearer is located in the master access network device, namely, the source access network device. That is, the PDCP entity of the source access network device performs operations such as enciphering and SN number addition, on a packet of the split bearer. The source access network device sends some first-type packets to the terminal device through the PDCP entity, an RLC entity, a MAC entity, and a PHY entity of the source access network device. The source access network device forwards other first-type packets to the target access network device, and then, the other first-type packets are sent to the terminal device through an RLC entity, a MAC entity, and a PHY entity of the target access network device.

After the source access network device stops implementing functions (including enciphering, SN number addition, and the like) of the PDCP entity, the source access network device notifies, through an Xn interface, the target access network device that the target access network device would not receive a first-type packet forwarded by the source access network device to the target access network device any more. A notification mode may be sending signaling through the Xn interface. The notification mode may alternatively be sending an end-marker (end-marker) on the Xn interface through the Xn interface, and an effect of the end-marker on the Xn interface is different from that of an end-marked received after a path switch (path switch) in an HO. An end-marker received after a path switch in a Long Term Evolution (Long Term Evolution, LTE) HO is used by the source access network device to notify the target access network device that the target access network device would not receive forwarded data through an X2 interface any more. Therefore, the end-marker needs to be distinguished from an end-marker after a current path switch. It should be noted that in LTE, communication between the source access network device and the target access network device is implemented through the X2 interface. In 5G, communication between the source access network device and the target access network device is implemented through an Xn interface.

Figure 4:
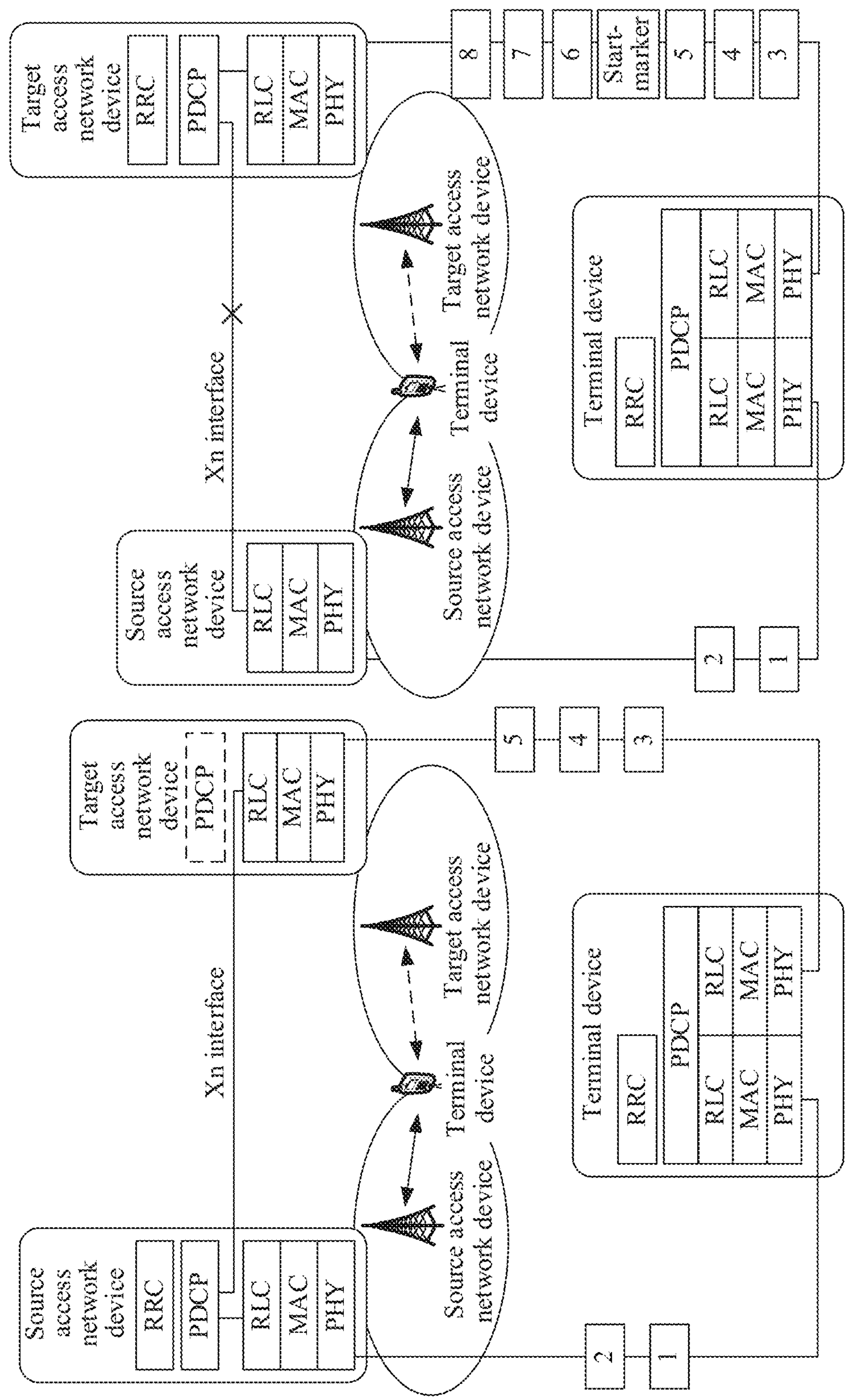
FIG. 4 is a schematic diagram of sending, by an access network device, a packet to a terminal device according to an embodiment of the present invention.

When master and secondary access network devices exchange roles, that is, the target access network device is switched from a secondary access network device to a master access network device, and the source access network device is switched from a master access network device to a secondary access network device, there are packets enciphered by the source access network device, namely, the first-type packets, inside the PDCP entity, the RLC entity, and the MAC entity of the source access network device and the RLC entity and the MAC entity of the target access network device. After the master and secondary access network devices exchange roles, a PDCP entity of the split bearer is located in the target access network device, data (that is, the second-type packets) enciphered by the target access network device by using a new key (that is, a second cipher key) is not transmitted through the RLC entity, the MAC entity, and the PHY entity of the source access network device any more, and is only transmitted through the RLC entity, the MAC entity, and the PHY entity of the target access network device. Therefore, after the target access network device performs the role exchange, first-type packets that are not transmitted to the terminal device need to be sent first. After sending all the first-type packets, the target access network device sends a start-marker (start-marker) to the terminal device, and the start-marker is the foregoing first indication information. In this case, the terminal device does not necessarily receive all the first-type packets successfully. To ensure that a time at which the start-marker is submitted by the RLC entity of the terminal device to the PDCP entity of the terminal device is earlier than a second-type packet and a subsequent second-type packet, the target access network device does not send a second-type packet to the terminal device before receiving an ACK message of the start-marker. In this case, the start-marker needs to carry information related to an SN or a COUNT of a split point between enciphering by using an old key and enciphering by using a new key on the PDCP entity. For content of the start-marker, refer to the content in the foregoing first indication information. Details are not described herein again. As shown in FIG. 4, No. 1 to No. 5 packets are first-type packets, and No. 6 to No. 8 packets are second-type packets. After sending the No. 5 packet to the terminal device, the target access network device sends a start-marker to the terminal device. To ensure that the start-marker arrives at the PDCP entity of the terminal device before No. 6 to No. 8 packets, that is, times at which a No. 6 packet and a subsequent packet are submitted by the RLC entity of the terminal device to the PDCP entity of the terminal device are later than the start-marker, the target access network device does not send No. 6 to No. 8 packets before receiving an ACK message of the start-marker returned by the terminal device. In this case, the start-marker needs to carry information related to an SN or a COUNT of a split point between enciphering by using an old key and enciphering by using a new key on the PDCP entity. For example, the start-marker carries an SN number, 6, to indicate that a No. 6 packet and a subsequent packet of the No. 6 packet are packets enciphered by using the new key.

In a second implementation, after master and secondary access network devices exchange roles, the second-type packets may be transmitted through an RLC entity, a MAC entity, and a PHY entity of the source access network device, or may be transmitted through an RLC entity, a MAC entity, and a PHY entity of the target access network device. The access network device that sends the first indication information may be a source access network device or a target access network device. Alternatively, the source access network device and the target access network device send the first indication information separately. Descriptions are provided below with respect to the three cases respectively.

In a first case of the second implementation, the access network device that sends the first indication information is the source access network device. In this case, before master and secondary access network devices exchange roles, a PDCP entity of the split bearer is located in the source access network device. After the source access network device sends all the first-type packets, an end-marker is sent to the terminal device through an air interface channel between the source access network device and the terminal device. The end-marker is the foregoing first indication information. Alternatively, after the source access network device sends all the first-type packets, an end-marker is sent to the terminal device through an air interface channel between the target access network device and the terminal device. The end-marker is the foregoing first indication information. That is, the source access network device generates an end-marker, and sends the end-marker to the target access network device, and the target access network device sends the end-marker to the terminal device. The end-marker carries information related to an SN or a COUNT of a split point between enciphering by using an old key and enciphering by using a new key on the PDCP entity. After the source access network device stops implementing functions (including enciphering, SN number addition, and the like) of the PDCP entity, the source access network device notifies, through an Xn interface, the target access network device that the target access network device would not receive a first-type packet forwarded by the source access network device to the target access network device any more. A notification mode is stated above, and details are not described herein again. After master and secondary access network devices exchange roles, the second-type packets may be transmitted to the terminal device through an RLC entity, a MAC entity, and a PHY entity of the source access network device, or may be transmitted to the terminal device through an RLC entity, a MAC entity, and a PHY entity of the target access network device.

To ensure that the end-marker arrives at the PDCP entity of the terminal device before the second-type packets, that is, a time at which the end-marker is submitted by the RLC entity of the terminal device to the PDCP entity of the terminal device is earlier than a second-type packet, the following two modes may be used. Mode 1: An ACK message of the end-marker received by the access network device is identified by the PDCP entity, and the source access network device may send the end-marker to the terminal device through an air interface channel between the source access network device and the terminal device or through an air interface channel between the target access network device and the terminal device. In this case, when the source access network device does not receive an ACK message of the end-marker returned by the terminal device or returned through the target access network device, the source access network device does not send a second-type packet to the terminal device. Only after receiving the ACK message of the end-marker returned by the terminal device, the source access network device sends second-type packets to the terminal device. In addition, after receiving the ACK message of the end-marker returned by the terminal device, the source access network device sends second indication information to the target access network device, where the second indication information is used to indicate that the target access network device can send a second-type packet to the terminal device. Therefore, before receiving the second indication information sent by the source access network device, the target access network device does not send a second-type packet to the terminal device. Alternatively, when the source access network device does not receive an ACK message of the end-marker returned by the terminal device, the master and secondary access network devices do not exchange roles. Only when an ACK message of the end-marker returned by the terminal device is received, the master and secondary access network devices exchange roles. Mode 2: An ACK message of the end-marker received by the access network device is identified by the RLC entity, and the following two sub-modes may be used. Sub-mode 1: If the source access network device sends the end-marker to the terminal device through the air interface channel between the source access network device and the terminal device, when the source access network device does not receive the ACK message of the end-marker returned by the terminal device, the source access network device does not send a second-type packet to the terminal device. Only after receiving the ACK message of the end-marker returned by the terminal device, the source access network device sends second-type packets to the terminal device. In addition, after receiving the ACK message of the end-marker returned by the terminal device, the source access network device sends second indication information to the target access network device, where the second indication information is used to indicate that the target access network device can send a second-type packet to the terminal device. Therefore, before receiving the second indication information sent by the source access network device, the target access network device does not send a second-type packet to the terminal device. Sub-mode 2: If the source access network device sends the end-marker to the terminal device through the air interface channel between the target access network device and the terminal device, when the target access network device does not receive the ACK message of the end-marker returned by the terminal device, the target access network device does not send a second-type packet to the terminal device. Only after receiving the ACK message of the end-marker returned by the terminal device, the target access network device sends second-type packets to the terminal device. After receiving the ACK message of the end-marker returned by the terminal device, the target access network device sends second indication information to the source access network device, where the second indication information is used to indicate that the source access network device can send a second-type packet to the terminal device. Therefore, before receiving the second indication information sent by the target access network device, the source access network device does not send a second-type packet to the terminal device.

Figure 5:
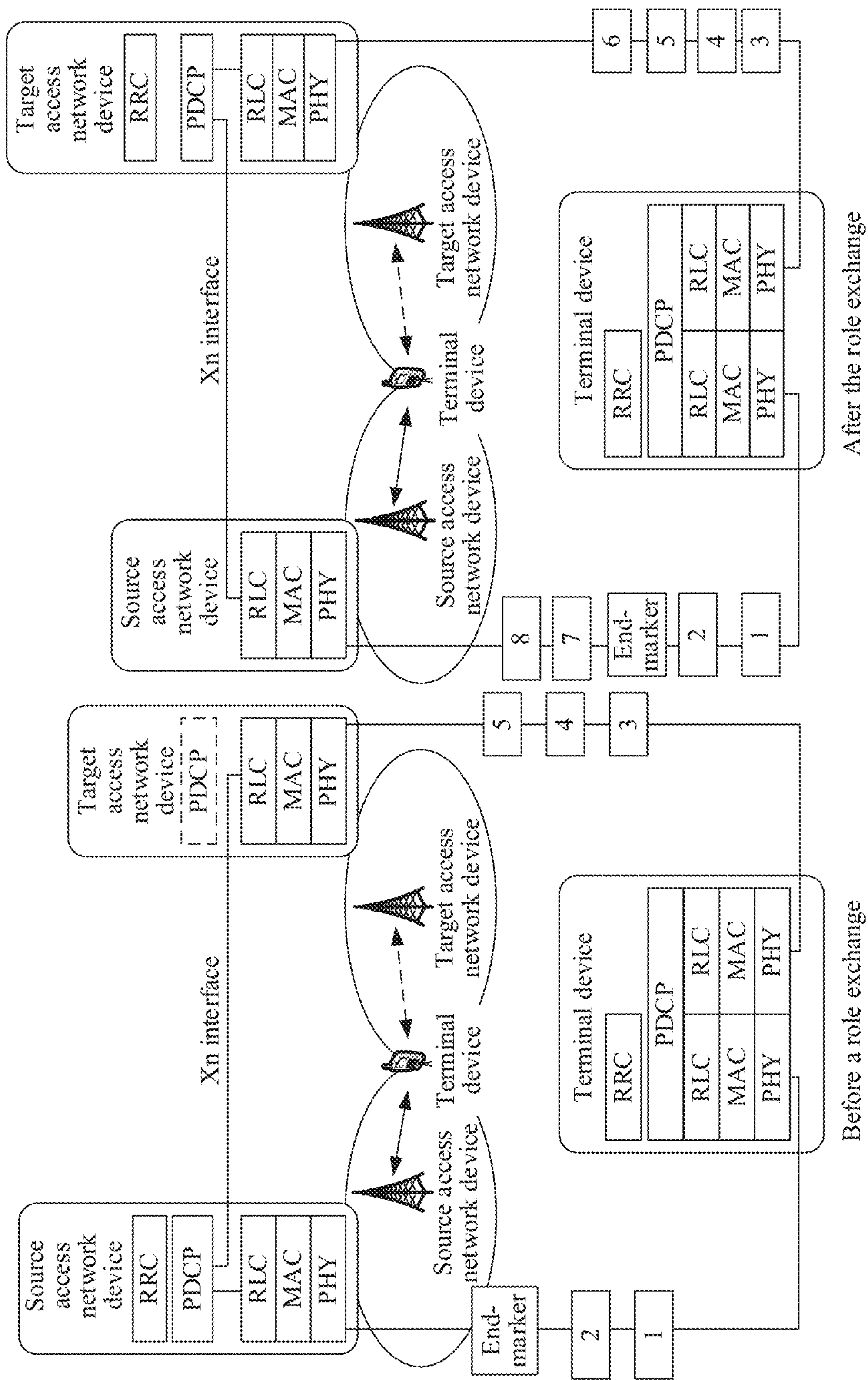
FIG. 5 is another schematic diagram of sending, by an access network device, a packet to a terminal device according to an embodiment of the present invention.

As shown in FIG. 5, No. 1 to No. 5 packets are first-type packets, and No. 6 to No. 8 packets are second-type packets. After the source access network device sends a No. 2 packet, the source access network device sends an end-marker to the terminal device. Then, the master and secondary access network devices exchange roles. To ensure that the end-marker arrives at the PDCP entity of the terminal device before the No. 6 packet, that is, a time at which the end-marker is submitted by the RLC entity of the terminal device to the PDCP entity of the terminal device is earlier than the No. 6 packet and a subsequent packet, the source access network device does not send the No. 7 and No. 8 packets to the terminal device before receiving the ACK message of the end-marker. In addition, before receiving the ACK message of the end-marker, the source access network device does not send second indication information to the target access network device, and before receiving the second indication information, the target access network device does not send the No. 6 packet to the terminal device. Only after receiving the ACK message of the end-marker returned by the terminal device, the source access network device sends the No. 7 and No. 8 packets to the terminal device. In addition, second indication information is sent to the target access network device, and after receiving the second indication information, the target access network device sends the No. 6 packet to the terminal device.

In a second case of the second implementation, the access network device that sends the first indication information is the target access network device. In this case, before the master and secondary access network devices exchange roles, a PDCP entity of the split bearer is located in the source access network device. After the source access network device stops implementing functions (including enciphering, SN number addition, and the like) of the PDCP entity, the source access network device notifies, through an Xn interface, the target access network device that the target access network device would not receive a first-type packet forwarded by the source access network device to the target access network device any more. A notification mode is stated above, and details are not described herein again. When the master and secondary access network devices exchange roles, there are first-type packets in the RLC entity and the MAC entity of the target access network device. Therefore, after the master and secondary access network devices exchange roles, after the source access network device sends all the first-type packets to the terminal device, a start-marker is sent to the terminal device through an air interface channel between the target access network device and the terminal device. The start-marker is the foregoing first indication information. Alternatively, after the target access network device sends all the first-type packets to the terminal, a start-marker is sent to the terminal device through an air interface channel between the source access network device and the terminal device. The start-marker is the foregoing first indication information. That is, the target access network device sends the start-marker to the source access network device, and the source access network device sends the start-marker to the terminal device. The start-marker carries information related to an SN or a COUNT of a split point between enciphering by using an old key and enciphering by using a new key on the PDCP entity. After master and secondary access network devices exchange roles, the second-type packets may be transmitted to the terminal device through an RLC entity, a MAC entity, and a PHY entity of the source access network device, or may be transmitted to the terminal device through an RLC entity, a MAC entity, and a PHY entity of the target access network device.

To ensure that the start-marker arrives at the PDCP entity of the terminal device before the second-type packets, that is, a time at which the start-marker is submitted by the RLC entity of the terminal device to the PDCP entity of the terminal device is earlier than a second-type packet, the following two modes may be used. Mode 1: An ACK message of the start-marker received by the access network device is identified by the PDCP entity, and the target access network device may send the start-marker to the terminal device through an air interface channel between the target access network device and the terminal device or through an air interface channel between the source access network device and the terminal device. Therefore, when the target access network device does not receive an ACK message of the start-marker returned by the terminal device or returned through the source access network device, the target access network device does not send a second-type packet to the terminal device. Only after receiving the ACK message of the start-marker returned by the terminal device, the target access network device sends second-type packets to the terminal device. In addition, after receiving the ACK message of the start-marker returned by the terminal device, the target access network device sends second indication information to the source access network device, where the second indication information is used to indicate that the target access network device can send a second-type packet to the terminal device. Therefore, before receiving the second indication information sent by the target access network device, the source access network device does not send a second-type packet to the terminal device.

Mode 2: An ACK message of the end-marker received by the access network device is identified by the RLC entity, and the following two sub-modes may be used. Sub-mode 1: If the target access network device sends the start-marker to the terminal device through the air interface channel between the target access network device and the terminal device, when the target access network device does not receive the ACK message of the start-marker returned by the terminal device, the target access network device does not send a second-type packet to the terminal device. Only after receiving the ACK message of the start-marker returned by the terminal device, the target access network device sends second-type packets to the terminal device. In addition, after receiving the ACK message of the start-marker returned by the terminal device, the target access network device sends second indication information to the source access network device, where the second indication information is used to indicate that the source access network device can send a second-type packet to the terminal device. Therefore, before receiving the second indication information sent by the target access network device, the source access network device does not send a second-type packet to the terminal device. Sub-mode 2: If the target access network device sends the start-marker to the terminal device through the air interface channel between the source access network device and the terminal device, when the source access network device does not receive the ACK message of the start-marker returned by the terminal device, the source access network device does not send a second-type packet to the terminal device. Only after receiving the ACK message of the start-marker returned by the terminal device, the source access network device sends second-type packets to the terminal device. In addition, after receiving the ACK message of the start-marker returned by the terminal device, the source access network device sends second indication information to the target access network device, where the second indication information is used to indicate that the target access network device can send a second-type packet to the terminal device. Therefore, before receiving the second indication information sent by the source access network device, the target access network device does not send a second-type packet to the terminal device.

Figure 6:
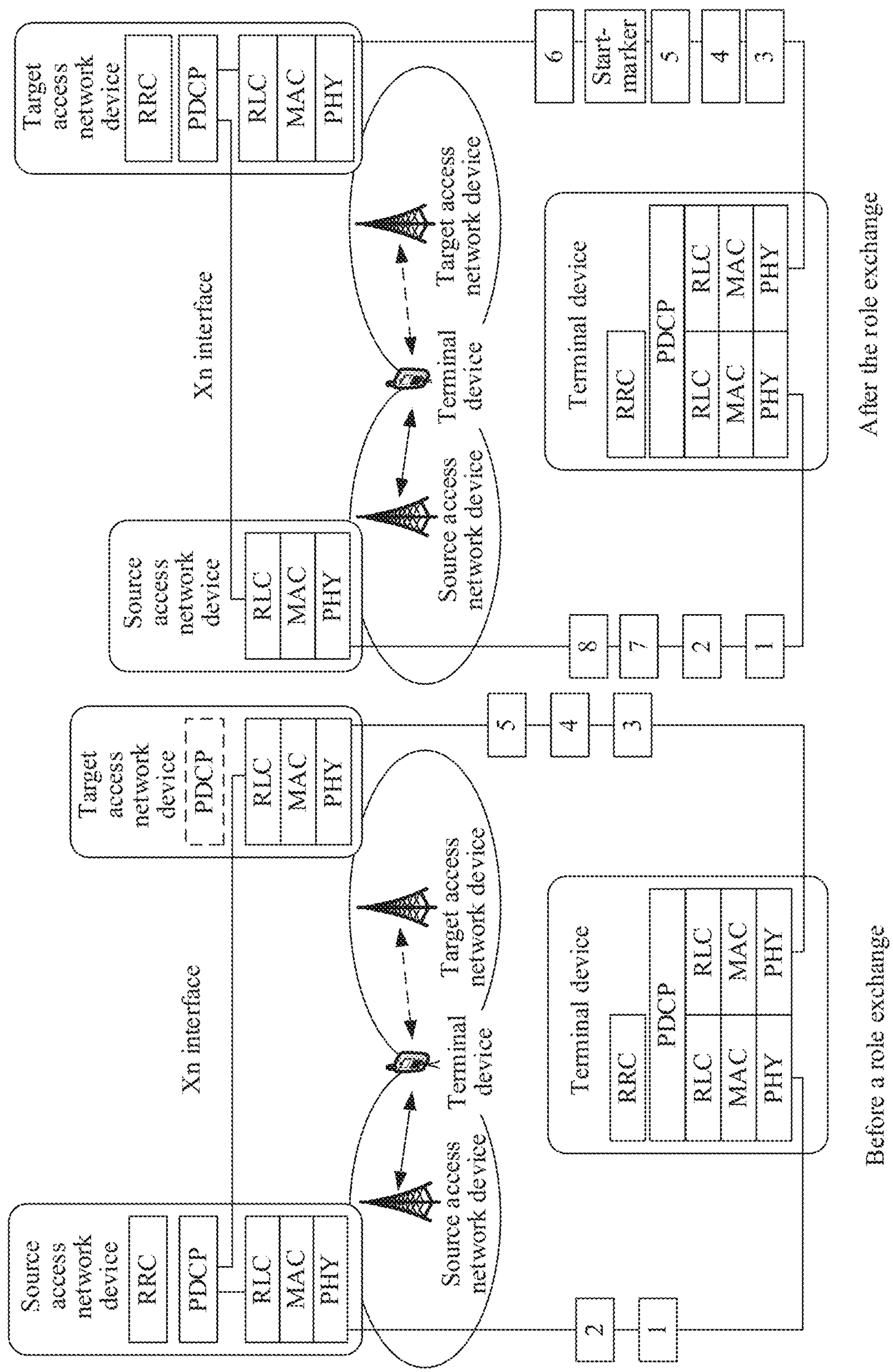
FIG. 6 is another schematic diagram of sending, by an access network device, a packet to a terminal device according to an embodiment of the present invention.

As shown in FIG. 6, No. 1 to No. 5 packets are first-type packets, and No. 6 to No. 8 packets are second-type packets. After sending the No. 5 packet, the target access network device sends a start-marker to the terminal device. To ensure that the start-marker arrives at the PDCP entity of the terminal device before the No. 6 packet, that is, a time at which the start-marker is submitted by the RLC entity of the terminal device to the PDCP entity of the terminal device is earlier than the No. 6 packet and a subsequent packet, the target access network device does not send the No. 6 packet to the terminal device before receiving the ACK message of the start-marker. In addition, before receiving the ACK message of the start-marker, the target access network device does not send second indication information to the source access network device, and before receiving the second indication information, the source access network device does not send the No. 7 and No. 8 packets to the terminal device. Only after receiving the ACK message of the start-marker returned by the terminal device, the target access network device sends the No. 6 packet to the terminal device. In addition, the second indication information is sent to the source access network device, and after receiving the second indication information, the source access network device sends the No. 7 and No. 8 packets to the terminal device.

In a third case of the second implementation, the access network devices that send the first indication information are the source access network device and the target access network device. In this case, before the master and secondary access network devices exchange roles, a PDCP entity of the split bearer is located in the source access network device. After the source access network device stops implementing functions (including enciphering, SN number addition, and the like) of the PDCP entity, the source access network device notifies, through an Xn interface, the target access network device that the target access network device would not receive a first-type packet forwarded by the source access network device to the target access network device any more. A notification mode is stated above, and details are not described herein again. After sending all the first-type packets, the source access network device sends an end-marker to the terminal device. The end-marker carries information related to an SN or a COUNT of a split point between enciphering by using an old key and enciphering by using a new key on the PDCP entity. After master and secondary access network devices exchange roles, the second-type packets may be transmitted to the terminal device through an RLC entity, a MAC entity, and a PHY entity of the source access network device, or may be transmitted to the terminal device through an RLC entity, a MAC entity, and a PHY entity of the target access network device. To ensure that the end-marker arrives at the PDCP entity of the terminal device before a second-type packet, that is, a time at which the end-marker is submitted by the RLC entity of the terminal device to the PDCP entity of the terminal device is earlier than the second-type packet, the source access network device does not send a second-type packet to the terminal device before receiving an ACK message of the end-marker returned by the terminal device. Only after receiving the ACK message of the end-marker returned by the terminal device, the source access network device sends second-type packets to the terminal device. Similarly, after sending all the first-type packets to the terminal device, the target access network device sends a start-marker to the terminal device, and the start-parker carries information related to an SN or a COUNT of a split point between enciphering by using an old key and enciphering by using a new key on the PDCP entity. To ensure that the start-marker arrives at the PDCP entity of the terminal device before a second-type packet, that is, a time at which the start-marker is submitted by the RLC entity of the terminal device to the PDCP entity of the terminal device is earlier than the second-type packet, the target access network device does not send a second-type packet to the terminal device before receiving an ACK message of the start-marker returned by the terminal device. Only after receiving the ACK message of the start-marker returned by the terminal device, the target access network device sends second-type packets to the terminal device.

Figure 7:
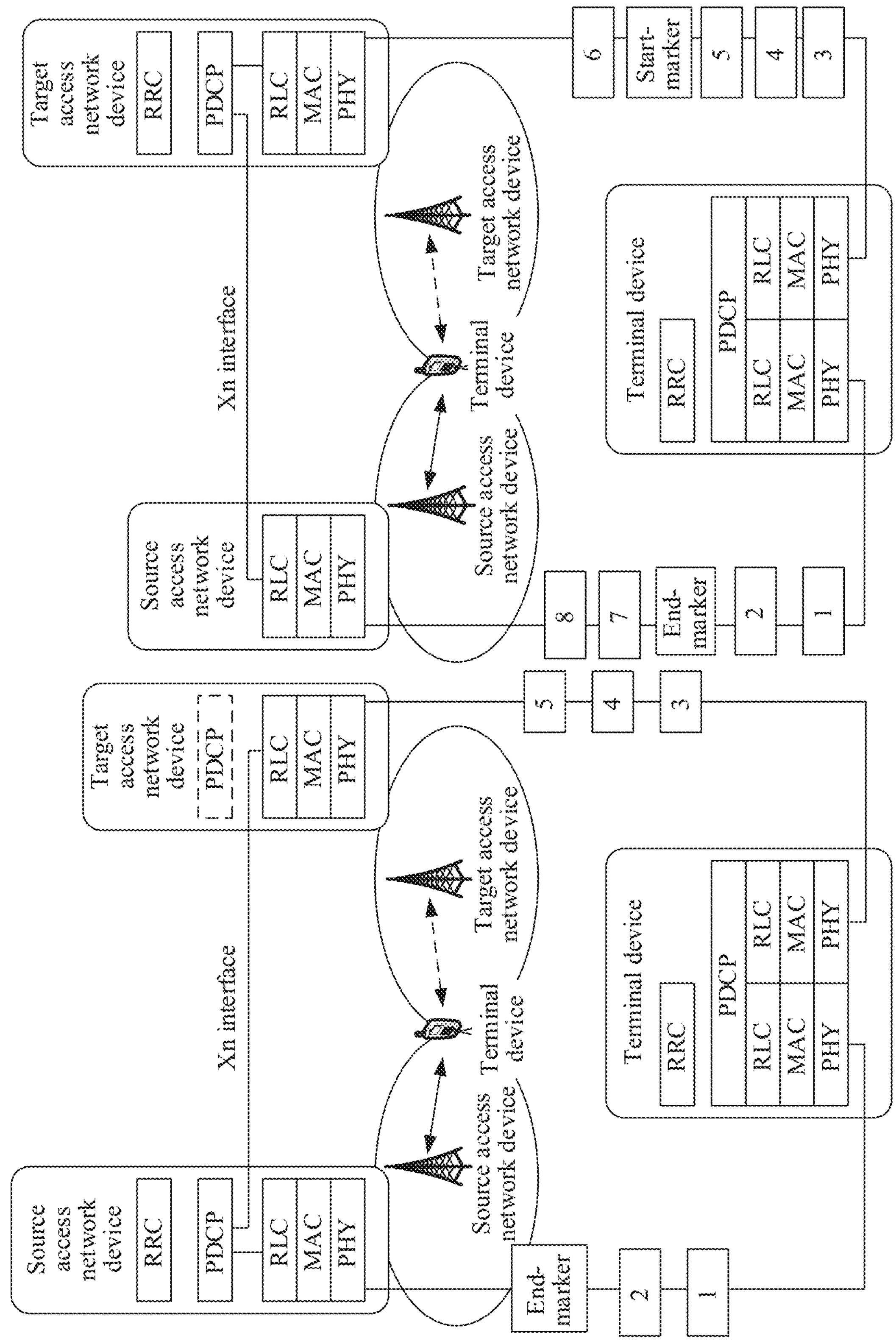
FIG. 7 is another schematic diagram of sending, by an access network device, a packet to a terminal device according to an embodiment of the present invention.

As shown in FIG. 7, No. 1 to No. 5 packets are first-type packets, and No. 6 to No. 8 packets are second-type packets. After sending the No. 2 packet to the terminal device, the source access network device sends an end-marker to the terminal device. Then, the master and secondary access network devices exchange roles. To ensure that the end-marker arrives at the PDCP entity of the terminal device before the No. 7 packet, that is, a time at which the end-marker is submitted by the RLC entity of the terminal device to the PDCP entity of the terminal device is earlier than the No. 7 packet and a subsequent packet, the source access network device does not send the No. 7 and No. 8 packets to the terminal device before receiving the ACK message of the end-marker. Only after receiving the ACK message of the end-marker returned by the terminal device, the source access network device sends the No. 7 and No. 8 packets to the terminal device. Similarly, after sending the No. 5 packet to the terminal device, the target access network device sends a start-marker to the terminal device. To ensure that the start-marker arrives at the PDCP entity of the terminal device before the No. 6 packet, that is, a time at which the start-marker is submitted by the RLC entity of the terminal device to the PDCP entity of the terminal device is earlier than the No. 6 packet and a subsequent packet, the target access network device does not send No. 6 packet to the terminal device before receiving the ACK message of the start-marker. Only after receiving the ACK message of the start-marker returned by the terminal device, the target access network device sends the No. 6 packet to the terminal device.

It should be noted that the first indication information may be carried in a data PDU or a control PDU. In the prior art, the data PDU includes an SN field. Therefore, an SN field in a data PDU in the prior art may be continuously used to indicate the first indication information. Alternatively, a novel type of control PDU may be used for the first indication information. The control PDU carries an SN number or a COUNT value. The carried SN number may be an SN number corresponding to a last packet in first-type packets, an SN number corresponding to a first packet in second-type packets, and a difference between the SN number corresponding to the last packet in the first-type packets and an offset, or a difference between the SN number corresponding to the first packet in the second-type packets and an offset. The carried COUNT value may be a COUNT value corresponding to a last packet in first-type packets, a COUNT value corresponding to a first packet in second-type packets, and a difference between the COUNT value corresponding to the last packet in the first-type packets and an offset, or a difference between the COUNT value corresponding to the first packet in the second-type packets and an offset. For example, if the first indication information indicates an SN number, 6, of the first packet in the second-type packets, a data. PDU whose SN number is 6 may be used to indicate the first indication information, and the SN number in the data PDU is 6. Alternatively, using the SN being 12 bits as an example, the SN field in the control PDU is set to 000000000110.

If the first indication information is carried in the data PDU, the data PDU needs to carry third indication information, where the third indication information is used for the terminal device to identify the first indication information carried in the data PDU. In addition, the terminal device may only monitor the third indication information when the source access network device and the target access network device exchange roles. For example, after receiving a Radio Resource Control (Radio Resource Control, RRC) reconfiguration message sent by the source access network device, the terminal device starts to monitor whether the data PDU carries the third indication information, and stops monitoring after detecting the third indication information. The RRC reconfiguration message may indicate that the master and secondary access network devices will exchange roles. For example, the first indication information is an SN number, 6, one bit in a P field or an R field in a data PDU header whose SN number is 6 is used to carry the third indication information. For example, when the bit is 1, it indicates that the data PDU carries the first indication information, and when the bit is 0, it indicates that the data PDU does not carry the first indication information.

In both of the two implementations described above, the first indication information is sent to the terminal device after the first-type packets are sent and before the second-type packets are sent, and in a third implementation of this embodiment of the present invention, the first indication information may alternatively be sent to the terminal device before the first-type packets are sent. The third implementation is described below.

Figure 8:
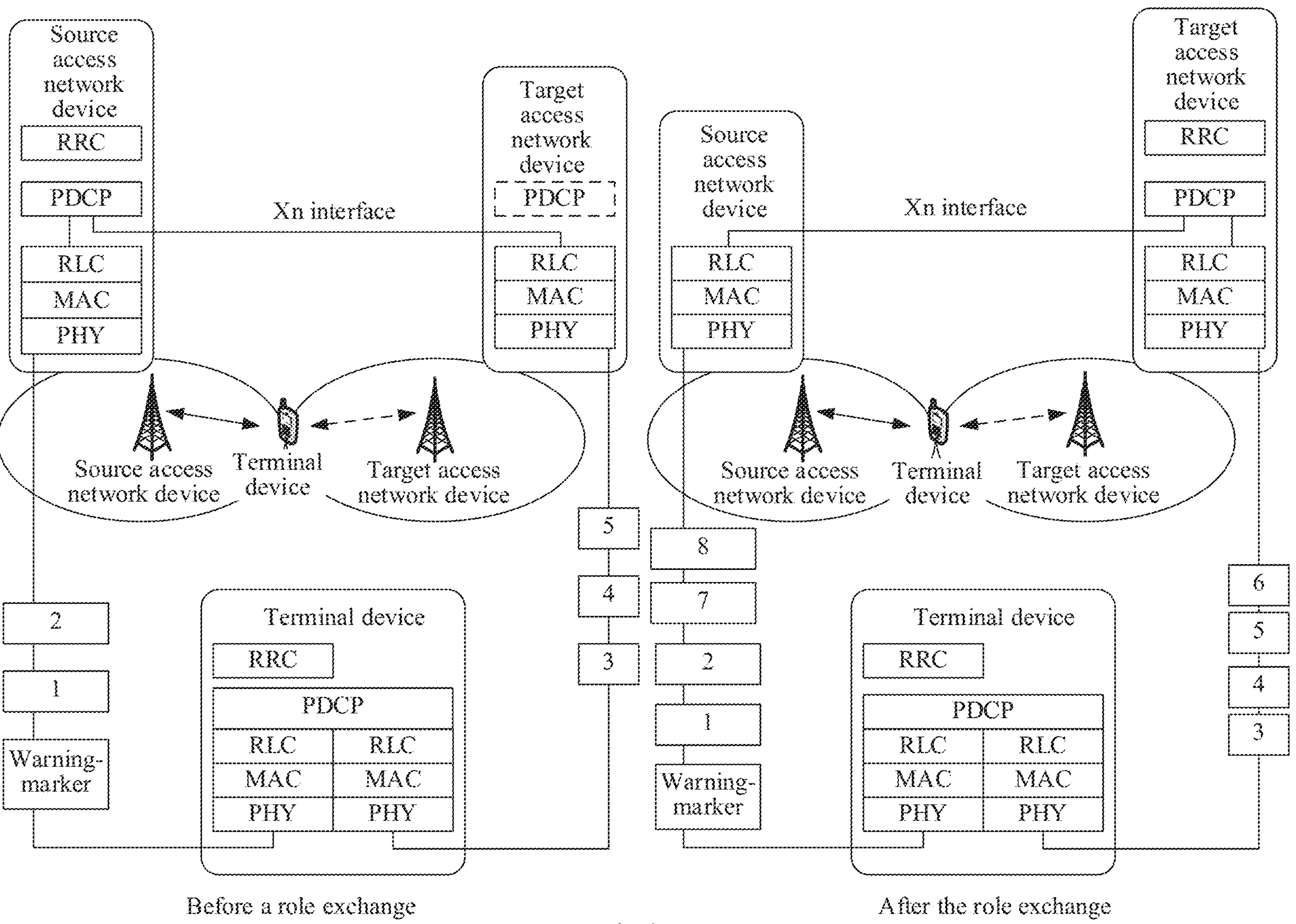
FIG. 8 is another schematic diagram of sending, by an access network device, a packet to a terminal device according to an embodiment of the present invention.

Before the master and secondary access network devices exchange roles, source access network device sends a warning-marker (warning-marker) to the terminal device through either an air interface channel between the source access network device and the terminal device or an air interface channel between the target access network device and the terminal device. The warning-marker is the first indication information. The first indication information includes at least one type of the following information: an SN number or a COUNT value corresponding to the last packet in the first-type packets, an SN number or a COUNT value corresponding to the first packet in the second-type packets, a difference between the SN number or COUNT value corresponding to the last packet in the first-type packets and an offset, and a difference between the SN number or COUNT value corresponding to the first packet in the second-type packets and an offset. In this implementation, the first indication information may alternatively be carried in a data PDU or a control PDU. If the first indication information is carried in the data PDU, an SN number of the data PDU is the SN number of the PDU, and is different from the SN number corresponding to the last packet in the first-type packets or the first packet in the second-type packets by an offset N, indicating that a packet after an $N^{th}$ packet after the SN number of the data PDU or the $N^{th}$ packet and a packet after the $N^{th}$ packet are second-type packets. A specific range of second-type packets depends on a definition of the offset. The terminal device may obtain a value of N from an RRC reconfiguration message. Likewise, the data PDU also needs to carry third indication information, where the third indication information is used to indicate that the data PDU carries the first indication information. For example, if an SN number carried by the data PDU is 3, and an offset is 3, it indicates that a packet whose SN number is greater than 6 is a second-type packet, or packets whose SN numbers are greater than or equal to 6 are all second-type packet. A range of the second-type packets specifically depends on the offset. Likewise, the control PDU may also carry the first indication information. In this embodiment, an example in which the target access network device and the terminal device learn of the offset, N, in advance is used for description. In another optional implementation, if the source access network device and the terminal device do not learn of the offset, N, in advance, the offset, N, may be carried in the data PDU or control PDU. For example, the data PDU carrying the first information carries the offset, N, and the control PDU may also carry the first indication information and the offset, N. It should be noted that the source terminal device may send the first indication information to the terminal device before sending the first packet in the first-type packets, or may send the first indication information to the terminal device before an $M^{th}$ (M is less than a quantity of the first-type packets) packet in the first-type packets. This is not limited in this embodiment of the present invention. After the master and secondary access network devices exchange roles, the second-type packets may be transmitted through an RLC entity, a MAC entity, and a PHY entity of the source access network device, or may be transmitted through an RLC entity, a MAC entity, and a PHY entity of the target access network device. However, before the target access network device sends the second-type packets, it should be ensured that the terminal device has received a warning-marker. As shown in FIG. 8, No. 1 to No. 5 packets are first-type packets, and No. 6 to No. 8 packets are second-type packets. To ensure that the warning-marker arrives at the PDCP entity of the terminal device before the second-type packets, that is, a time at which the warning-marker is submitted by the RLC entity of the terminal device to the PDCP entity of the terminal device is earlier than the second-type packets, the following two modes may be used. Mode 1: Before receiving an ACK message of warning-marker, the source access network device may continue sending N packets in the first-type packets, but does not send a second-type packet. Only after the ACK message of the warning-marker is received, the second-type packets are sent to the terminal device. In this case, the warning-marker needs to carry information related to an SN or a COUNT of a split point between enciphering by using an old key and enciphering by using a new key on the PDCP entity (that is, the No. 6 packet is the first packet in the second-type packets. Mode 2: This may be ensured by choosing N that is large enough. Based on functions of the PDCP entity, only a PDCP PDU in a reordering window is deciphered and stored. For example, an offset, "N", may be set to a length of the reordering window or be longer than the reordering window, to ensure that when the terminal device receives the warning-marker, the second-type packets cannot be processed by the PDCP entity of the terminal device.

Figure 9:
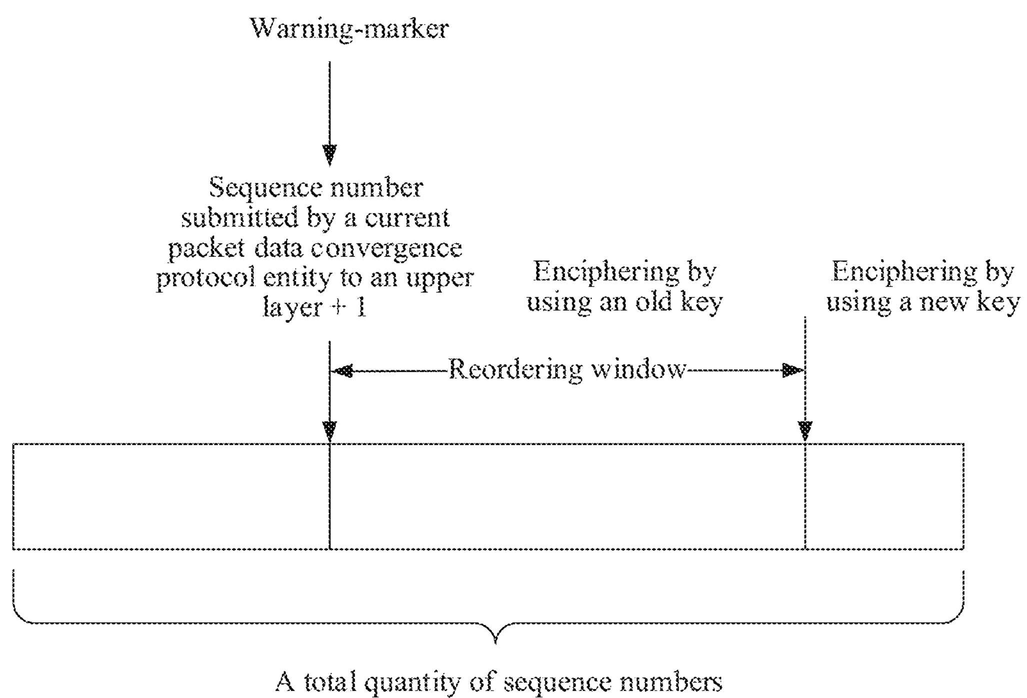
FIG. 9 is a schematic diagram of receiving, by a terminal device, data sent by an access network device according to an embodiment of the present invention.

FIG. 9 is a schematic diagram of receiving, by a terminal device, data sent by an access network device according to an embodiment of the present invention. As shown in FIG. 9, an offset, "N", may be set to a length of a reordering window. A total quantity of SNs is a maximum SN number whose length is 12 bits as defined in a communications standard or a maximum SN number whose length is 18 bits. When the terminal device does not receive a warning-marker, a packet enciphered by using a new key would not enter into the reordering window. That is, the packet is not deciphered. When the terminal device receives the warning-marker, there are all packets enciphered by using an old key in the reordering window. When the warning-marker is a data PDU, third indication information is needed, and corresponding detection needs to be performed. When the warning-marker is a control PDU, a first method is that an SN or a COUNT value carried in the control PDU is a difference between an SN number or a COUNT value corresponding to a last packet in first-type packets and an offset, or a difference between an SN number or a COUNT value corresponding to a first packet in second-type packets and an offset. In addition, the access network device does not send a packet corresponding to the SN number or the COUNT value carried in the control PDU or a plurality of packets after a packet corresponding to the SN number or the COUNT value to the terminal device. After receiving the control PDU, the terminal device skips a packet whose number is not sent or a plurality of specified packets and directly processes a subsequent packet. For example, if a packet on a boundary between new and old keys is a No. 5 packet, a carried SN number is 2, N=3, and when sending packets to the terminal device, the access network device only sends No. 1, No. 3, No. 4, No. 5, . . . packets, when a control PDU carrying an SN number, 2, is received, a reordering window may move backward when a No. 2 packet is not received, or if a boundary is 5, a carried SN number is 2, N=3, and when packets are sent, only No. 1, No. 4, No. 5, . . . packets are sent, and when a control PDU carrying an SN number, 2, is received, a reordering window may move backward when No. 2 and No. 3 packets are not received. A specific quantity of skipped packets depends on configuration of the access network device. A second method is that the control PDU carries an SN number or a COUNT value corresponding to a last packet in first-type packets, or an SN number or a COUNT value corresponding to a first packet in second-type packets. In addition, the access network device does not send a packet corresponding to the SN number or the COUNT value carried in the control PDU or a plurality of packets after a packet corresponding to the SN number or the COUNT value to the terminal device. After receiving the control PDU, the terminal device skips a packet whose number is not sent and directly processes a subsequent packet. For example, if a packet on a boundary between new and old keys is a No. 5 packet, a carried SN number is 5, N=3, and when packets are sent, No. 1, No. 3, No. 4, No. 5, . . . packets are sent, when a control PDU carrying an SN number, 5, is received, based on 5−N=2, a reordering window may move backward when a No. 2 packet is not received, or if a boundary is 5, a carried SN number is 5, N=3, and when packets are sent, only No. 1, No. 4, No. 5, . . . packets are sent, when a control PDU carrying an SN number, 5, is received, based on 5−N=2, a reordering window may move backward when No. 2 and No. 3 packets are not received. A specific quantity of skipped packets depends on configuration of the access network device. A third method is that an SN or a COUNT value carried in the control PDU is a difference between an SN number or a COUNT value corresponding to a last packet in first-type packets and an offset, or a difference between an SN number or a COUNT value corresponding to a first packet in second-type packets and an offset. In addition, when the access network device sends the control PDU, a data PDU carrying the SN number has not been sent. For example, if a boundary between new and old keys is a No. 5 packet, a carried SN number is 2, and N=3, when a No. 0 packet is sent, a control PDU carrying an SN number, 2, is sent. A fourth method is that an SN or a COUNT value carried in the control PDU is an SN number or a COUNT value corresponding to a last packet in first-type packets, or an SN number or a COUNT value corresponding to a first packet in second-type packets. In addition, when the access network device sends the control PDU, a data PDU carrying the SN number or a corresponding COUNT value minus an offset has not been sent. For example, if a boundary between new and old keys is a No. 5 packet, a carried SN number is 5, and N=3, when a No. 0 packet is sent, a control PDU carrying an SN number, 2, is sent.

S302: The terminal device receives the first indication information sent by the access network device and determines whether a received packet is the first-type packet or the second-type packet based on the first indication information.

The terminal device receives the first indication information, and may determine an SN number or a COUNT value of a last packet in the first-type packets or an SN number or a COUNT value of a first packet in the second-type packets based on the first indication information. For example, if the first indication information directly indicates an SN number of a last packet in the first-type packets or an SN number of a first packet in the second-type packets, the terminal device may directly obtain the SN number of the last packet in the first-type packets or the SN number of the first packet in the second-type packets. If the first indication information indicates a difference between an SN number corresponding to a last packet in the first-type packets and an offset, the terminal device needs to determine the SN number corresponding to the last packet in the first-type packets based on the first indication information and the offset. If the first indication information directly indicates a count corresponding to a last packet in the first-type packets, the terminal device may directly learn of the count corresponding to the last packet in the first-type packets based on the first indication information. If the first indication information directly indicates a count corresponding to a first packet in the second-type packets, the terminal device may directly learn the count corresponding to the first packet in the second-type packets based on the first indication information. If the first indication information directly indicates a difference between a count corresponding to a last packet in the first-type packets and an offset, the terminal device may calculate the count corresponding to the last packet in the first-type packets based on the difference and the offset. If the first indication information directly indicates a difference between a count corresponding to a first packet in the second-type packets and an offset, the terminal device may calculate the count corresponding to the first packet in the second-type packets based on the difference and the offset. For example, if the first indication information is 3, and the offset is 2, the terminal device determines that an SN number corresponding to a last packet in the first-type packets is 5. If the first indication information indicates a difference between an SN number corresponding to a first packet in second-type packets and an offset, the terminal device needs to determine the SN number corresponding to the first packet in the second-type packets based on the first indication information and the offset. For example, if the first indication information is 4, and the offset is 2, the terminal device determines that an SN number corresponding to a first packet in the second-type packets is 6. The offset is pre-negotiated by the terminal device and the access network device.

In the foregoing first implementation, the access network device that sends the first indication information is a target access network device, and the second-type packets are transmitted through only an RLC entity, a MAC entity, and a PHY entity of the target access network device. Therefore, the PDCP entity of the terminal device determines whether a received packet is a first-type packet or a second-type packet with reference to the received first indication information based on a correspondence with an access network device that sends data, that is, whether data is submitted by an RLC entity corresponding to a source access network device or an RLC entity corresponding to a target access network device. It should be noted that the terminal device includes two RLC entities, two MAC entities, and two PHY entities, where one RLC entity corresponds to the source access network device, and the other RLC entity corresponds to the target access network device. If the terminal device receives a packet from the source access network device, the terminal device may determine that the packet is a first-type packet. Before the terminal device receives the first indication information, if a packet is received from the target access network device, the terminal device may determine that the packet is a first-type packet. After the terminal device receives the first indication information, if a packet is received from the target access network device, the terminal device determines whether the received packet is a first-type packet or a second-type packet based on a COUNT value of the packet and a COUNT value that corresponds to a last packet in the first-type packets and that is indicated by the first indication information. A packet whose COUNT value is less than or equal to a COUNT value of a last packet in the first-type packets is determined as a first-type packet, and a packet whose COUNT value is greater than the COUNT value of the last packet in the first-type packets is determined as a second-type packet. Alternatively, the terminal device determines whether the received packet is a first-type packet or a second-type packet based on a COUNT value of the packet and a COUNT value that corresponds to a first packet in the second-type packets and that is indicated by the first indication information. A packet whose COUNT value is less than a COUNT value of a first packet in the second-type packets is determined as a first-type packet, and a packet whose COUNT value is greater than or equal to the COUNT value of the first packet in the second-type packets is determined as a second-type packet.

Figure 10:
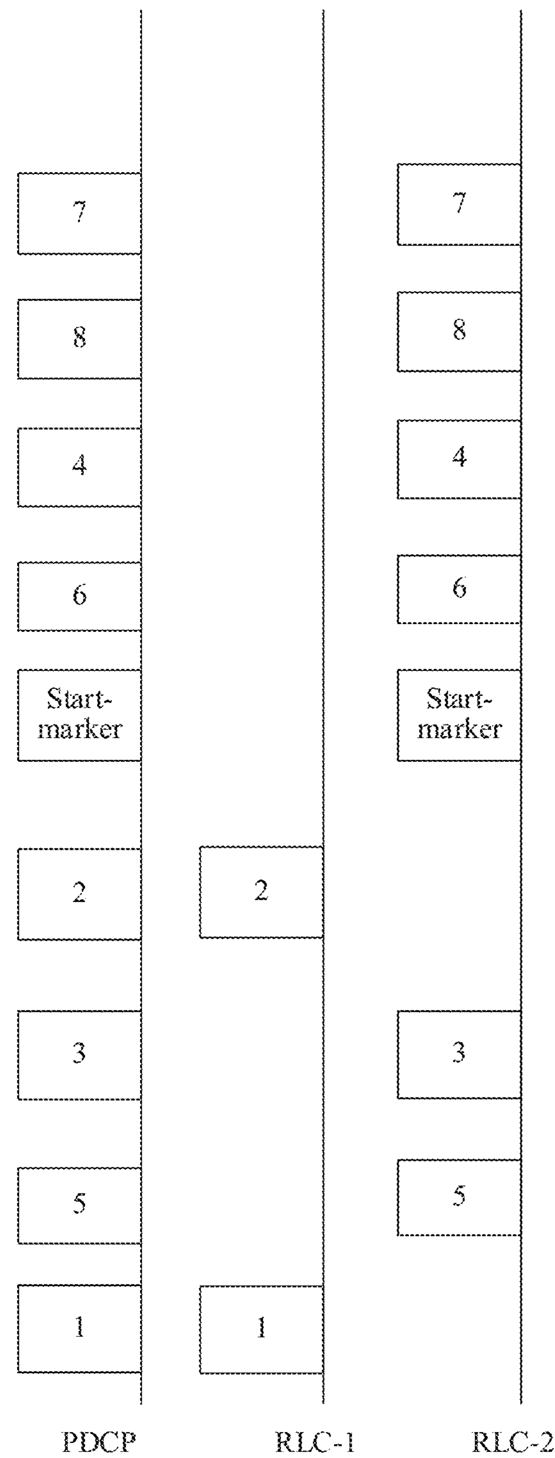
FIG. 10 is a schematic diagram of receiving, by a terminal device, a packet sent by an access network device according to an embodiment of the present invention.

As shown in FIG. 10, it can be learned from FIG. 4 to FIG. 8 that the terminal device has two sets each including an RLC entity, a MAC entity, and a PHY entity. One set of an RLC entity, a MAC entity, and a PHY entity corresponds to a protocol stack of the source access network device, and the other set of an RLC entity, a MAC entity, and a PHY entity corresponds to a protocol stack of the target access network device. In FIG. 10, RCL-1 corresponds to the source access network device, and RCL-2 corresponds to the source access network device. If the terminal device receives No. 1 and No. 2 packets from the source access network device, the No. 1 and No. 2 packets may be determined as first-type packets. Before the terminal device receives a start-marker, if packets received from the target access network device are a No. 5 packet and a No. 3 packet, it can be determined that No. 5 and No. 3 packets are first-type packets. A COUNT value of a first packet in the second-type packets indicated by the received start-marker is 6. The terminal device receives the start-marker and further receives No. 6, No. 4, No. 8, and No. 7 packets, and the terminal device may determine, based on the COUNT value, 6, indicated by the start-marker, that the No. 4 packet whose COUNT value is 4 is a first-type packet, and the No. 6, No. 8, and No. 7 packets whose COUNT values are respectively 6, 8, and 7 are second-type packets.

In a first case of the foregoing second implementation, the access network device that sends the first indication information is the source access network device. After master and secondary access network devices exchange roles, the second-type packets may be transmitted to the terminal device through an RLC entity, a MAC entity, and a PHY entity of the source access network device, or may be transmitted to the terminal device through an RLC entity, a MAC entity, and a PHY entity of the target access network device. Before the terminal device receives the first indication information, if a packet is received from the source access network device or the target access network device, the terminal device may determine that the packet is a first-type packet. After the terminal device receives the first indication information, if a packet is received from the source access network device or the target access network device, the terminal device determines Whether the received packet is a first-type packet or a second-type packet based on a COUNT value of the packet and a COUNT value that corresponds to a last packet in the first-type packets and that is indicated by the first indication information. A packet whose COUNT value is less than or equal to a COUNT value of a last packet in the first-type packets is determined as a first-type packet, and a packet whose COUNT value is greater than the COUNT value of the last packet in the first-type packets is determined as a second-type packet. Alternatively, the terminal device determines whether the received packet is a first-type packet or a second-type packet based on a COUNT value of the packet and a COUNT value of a first packet in the second-type packets indicated by the first indication information. A packet whose COUNT value is less than a COUNT value of a first packet in the second-type packets is determined as a first-type packet, and a packet whose COUNT value is greater than or equal to the COUNT value of the first packet in the second-type packets is determined as a second-type packet.

Figure 11:
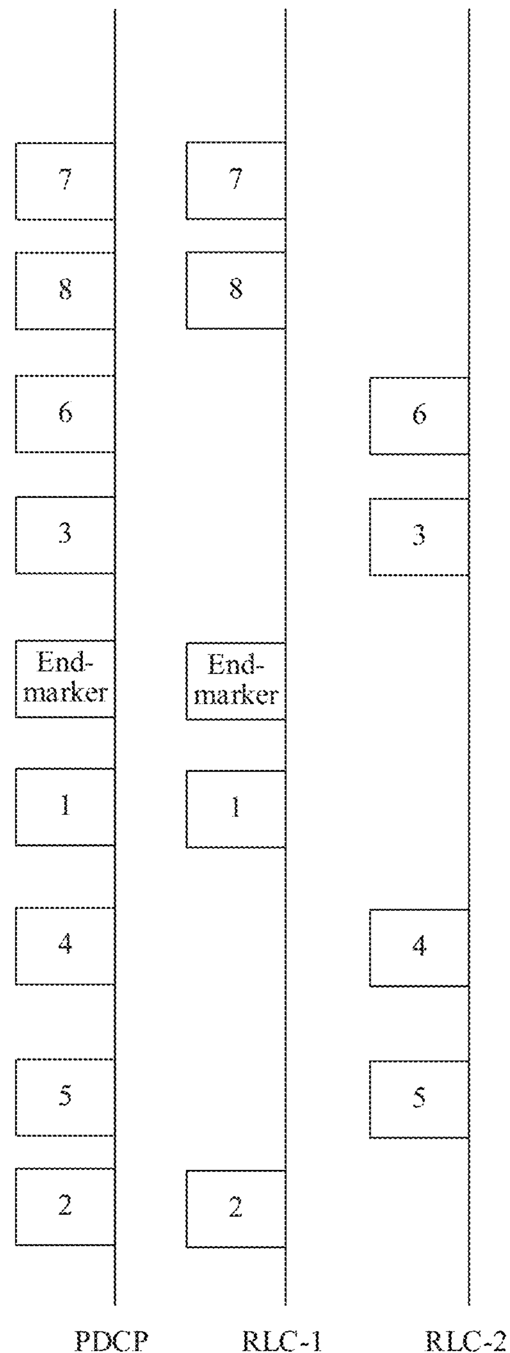
FIG. 11 is another schematic diagram of receiving, by a terminal device, a packet sent by an access network device according to embodiment of the present invention.

As shown in FIG. 11, before the terminal device receives an end-marker, if No. 2 and No. 1 packets are received from the source access network device, the No. 2 and No. 1 packets may be determined as first-type packets. Before the terminal device receives the end-marker, if No. 5 and No. 4 packets are received from the target access network device, the No. 5 and No. 4 packets may be determined as first-type packets. A COUNT value of a last packet in the first-type packets indicated by the end-marker received by the terminal device is 5. The terminal device receives the end-marker and further receives No. 3 and No. 6 packets from the target access network device, and the terminal device may determine, based on the COUNT value, 5, indicated by the end-marker, that the No. 3 packet whose COUNT value is 3 is a first-type packet, and the No. 6 packet whose COUNT value is 6 is a second-type packet. The terminal device receives the end-marker and further receives No. 8 and No. 7 packets from the source access network device, and the terminal device may determine, based on the COUNT value, 5, indicated by the end-marker, that the No. 8 and No. 7 packets whose COUNT values are respectively 8 and 7 are second-type packets.

In a second case of the foregoing second implementation, the access network device that sends the first indication information is the target access network device. After master and secondary access network devices exchange roles, the second-type packets may be transmitted to the terminal device through an RLC entity, a MAC entity, and a PHY entity of the source access network device, or may be transmitted to the terminal device through an RLC entity, a MAC entity, and a PHY entity of the target access network device. Before the terminal device receives the first indication information, if a packet is received from the source access network device or the target access network device, the terminal device may determine that the packet is a first-type packet. After the terminal device receives the first indication information, if a packet is received from the source access network device or the target access network device, the terminal device determines whether the received packet is a first-type packet or a second-type packet based on a COUNT value of the packet and a COUNT value that corresponds to a last packet in the first-type packets and that is indicated by the first indication information. A packet whose COUNT value is less than or equal to a COUNT value of a last packet in the first-type packets is determined as a first-type packet, and a packet whose COUNT value is greater than the COUNT value of the last packet in the first-type packets is determined as a second-type packet. Alternatively, the terminal device determines whether the received packet is a first-type packet or a second-type packet based on a COUNT value of the packet and a COUNT value of a first packet in the second-type packets indicated by the first indication information. A packet whose COUNT value is less than a COUNT value of a first packet in the second-type packets is determined as a first-type packet, and a packet whose COUNT value is greater than or equal to the SN number of the first packet in the second-type packets is determined as a second-type packet.

Figure 12:
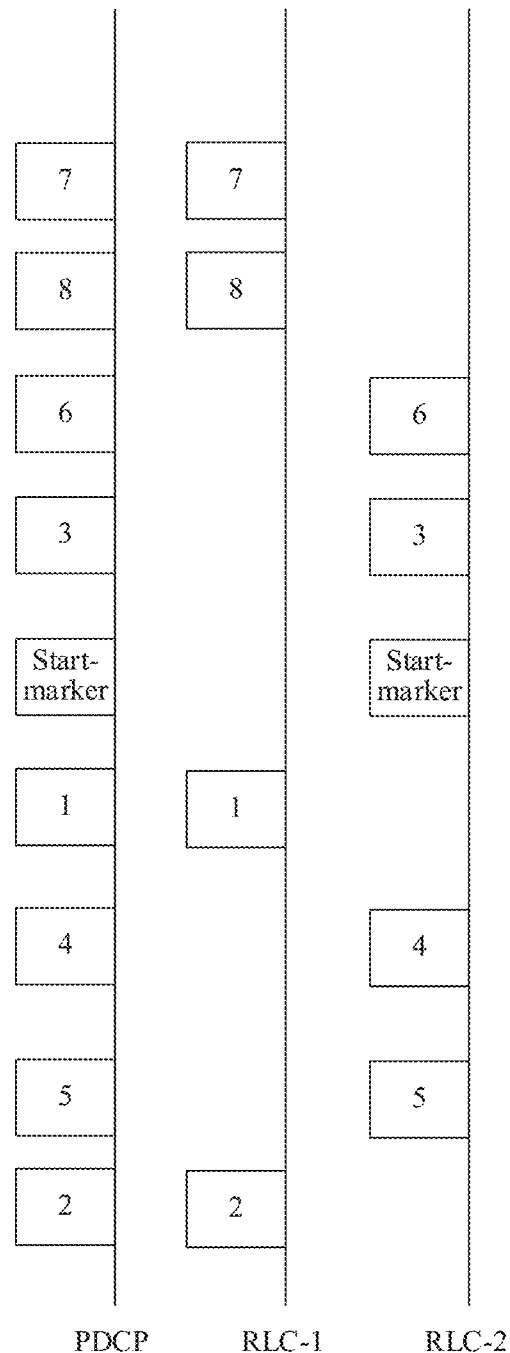
FIG. 12 is another schematic diagram of receiving, by a terminal device, a packet sent by an access network device according to an embodiment of the present invention.

As shown in FIG. 12, before the terminal device receives a start-marker, if No. 2 and No. 1 packets are received from the source access network device, the No. 2 and No. 1 packets may be determined as first-type packets. Before the terminal device receives the start-marker, if No. 5 and No. 4 packets are received from the target access network device, the No. 5 and No. 4 packets may be determined as first-type packets. A COUNT value of a first packet in the second-type packets indicated by the start-marker received by the terminal device is 6. The terminal device receives the start-marker and further receives No. 3 and No. 6 packets from the target access network device, and the terminal device may determine, based on the COUNT value, 6, indicated by the start-marker, that the No. 3 packet whose COUNT value is 3 is a first-type packet, and the No. 6 packet whose COUNT value is 6 is a second-type packet. The terminal device receives the start-marker and further receives No. 8 and No. 7 packets from the source access network device, and the terminal device may determine, based on the COUNT value, 6, indicated by the start-marker, that the No. 8 and No. 7 packets whose COUNT values are respectively 8 and 7 are second-type packets.

In a third case of the foregoing second implementation, the access network devices that send the first indication information are the source access network device and the target access network device. After master and secondary access network devices exchange roles, the second-type packets may be transmitted to the terminal device through an RLC entity, a MAC entity, and a PHY entity of the source access network device, or may be transmitted to the terminal device through an RLC entity, a MAC entity, and a PHY entity of the target access network device. Before the terminal device receives the first indication information sent by the source access network device, if a packet is received from the source access network device, the terminal device may determine that the packet is a first-type packet. After the terminal device receives the first indication information sent by the source access network device, if a packet is received from the source access network device, the terminal device determines whether the received packet is a first-type packet or a second-type packet based on a COUNT value of the packet and a COUNT value that corresponds to a last packet in the first-type packets and that is indicated by the first indication information sent by the source access network device. A packet whose COUNT value is less than or equal to a COUNT value of a last packet in the first-type packets is determined as a first-type packet, and a packet whose COUNT value is greater than the COUNT value of the last packet in the first-type packets is determined as a second-type packet. Before the terminal device receives the first indication information sent by the target access network device, if a packet is received from the target access network device, the terminal device may determine that the received packet is a first-type packet. After the terminal device receives the first indication information sent by the target access network device, if a packet is received from the target access network device, the terminal device determines whether the received packet is a first-type packet or a second-type packet based on a COUNT value of the packet and a COUNT value that corresponds to a first packet in the second-type packets and that is indicated by the first indication information sent by the target access network device. A packet whose COUNT value is less than a COUNT value of a first packet in the second-type packets is determined as a first-type packet, and a packet whose COUNT value is greater than or equal to the COUNT value of the first packet in the second-type packets is determined as a second-type packet.

Figure 13:
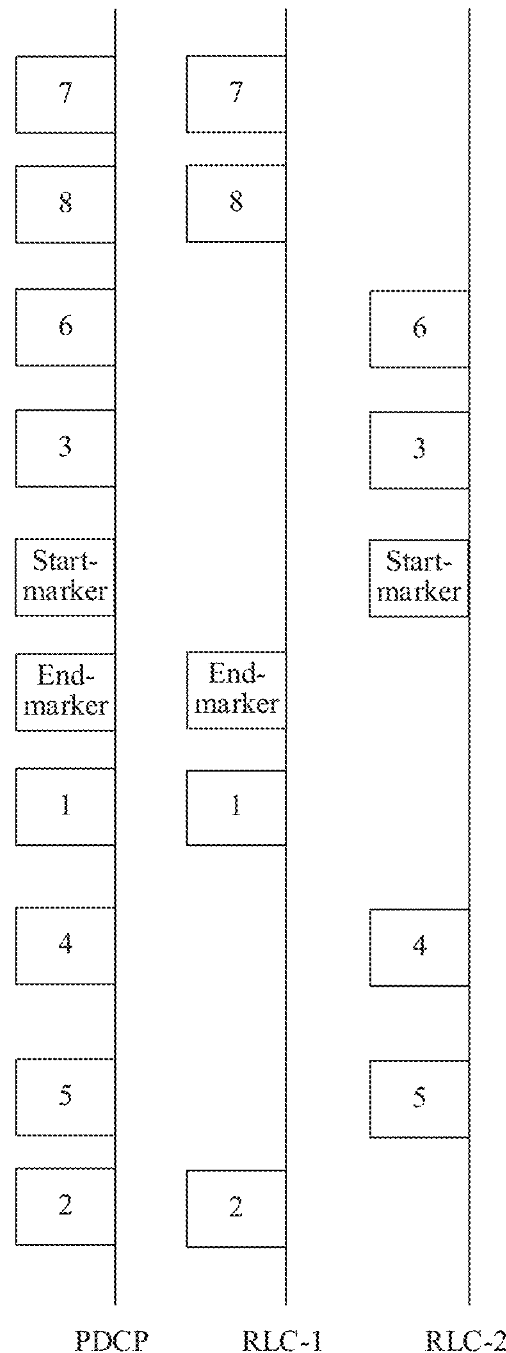
FIG. 13 is another schematic diagram of receiving, by a terminal device, a packet sent by an access network device according to an embodiment of the present invention.

As shown in FIG. 13, before the terminal device receives an end-marker sent by the source access network device, if No. 2 and No. 1 packets are received from the source access network device, the No. 2 and No. 1 packets may be determined as first-type packets. A COUNT value of a last packet in the first-type packets indicated by the end-marker that is received by the terminal device and that is sent by the source access network device is 5. The terminal device receives the end-marker and further receives No. 8 and No. 7 packets from the source access network device, and the terminal device may determine, based on the COUNT value, 5, indicated by the end-marker, that the No. 8 and No. 7 packets whose COUNT values are respectively 8 and 7 are second-type packets. Before the terminal device receives the start-marker sent by the target access network device, if No. 5 and No. 4 packets are received from the target access network device, the No. 5 and No. 4 packets whose COUNT values are respectively 5 and 4 may be determined as first-type packets. A COUNT value of a first packet in the second-type packets indicated by the start-marker that is received by the terminal device and that is sent by the target access network device is 6. The terminal device receives the start-marker and further receives No. 3 and No. 6 packets from the target access network device, and the terminal device may determine, based on the COUNT value, indicated by the start-marker, that the No. 3 packet whose COUNT value is 3 is a first-type packet, and the No. 6 packet whose COUNT value is 6 is a second-type packet.

In the foregoing third implementation, the access network device that sends the first indication information is a source access network device. The second-type packets may be transmitted through an RLC entity, a MAC entity, and a PHY entity of the source access network device, or may be transmitted through an RLC entity, a MAC entity, and a PHY entity of the target access network device. Before the terminal device receives the first indication information, if a packet is received from the source access network device or the target access network device, the received packet is determined as a first-type packet. After the terminal device receives the first indication information, if the first indication information directly indicates a COUNT value of a last packet in the first-type packets or a COUNT value of a first packet in the second-type packets, the terminal device may determine the COUNT value of the last packet in the first-type packets or the COUNT value of the first packet in the second-type packets based on the first indication information. If the first indication information carries an SN number or a COUNT value and N, the terminal device may calculate a COUNT value of the last packet in the first-type packets and a COUNT value of the first packet in the second-type packets based on the SN number or the COUNT value and N. For example, if the first indication information is carried in the data PDU, an SN number of the data PDU is 1, and N carried in the data PDU is 4, the terminal device may determine that the SN number of the last packet in the first-type packets is 5. Alternatively, if an SN number of the data PDU is 1, and N carried in the data PDU is 5, the terminal device may determine that the SN number of the first packet in the second-type packets is 6. Whether the first indication information specifically indicates the SN number of the last packet in the first-type packets or the SN number of the first packet in the second-type packets may be pre-negotiated by the terminal device and the source access network device. If N carried in the data PDU is 3, the terminal device may determine that the SN number of the first packet in the second-type packets is 6. After the terminal device receives the first indication information, if a packet is received from the source access network device or the target access network device, whether the received packet is a first-type packet or a second-type packet is determined based on a COUNT value corresponding to the received packet and a COUNT value that corresponds to a last packet in the first-type packets and that is indicated by the first indication information. A packet whose COUNT value is less than or equal to a COUNT value of a last packet in the first-type packets is determined as a first-type packet, and a packet whose COUNT value is greater than the COUNT value of the last packet in the first-type packets is determined as a second-type packet. Alternatively, if the terminal device determines a COUNT value of the first packet in the second-type packets based on the first indication information, whether the received packet is a first-type packet or a second-type packet is determined based on a COUNT value of the received packet and the COUNT value of the first packet in the second-type packets indicated by the first indication information. A packet Whose COUNT value is less than a COUNT value of a first packet in the second-type packets is determined as a first-type packet, and a packet whose COUNT value is greater than or equal to the COUNT value of the first packet in the second-type packets is determined as a second-type packet.

Figure 14:
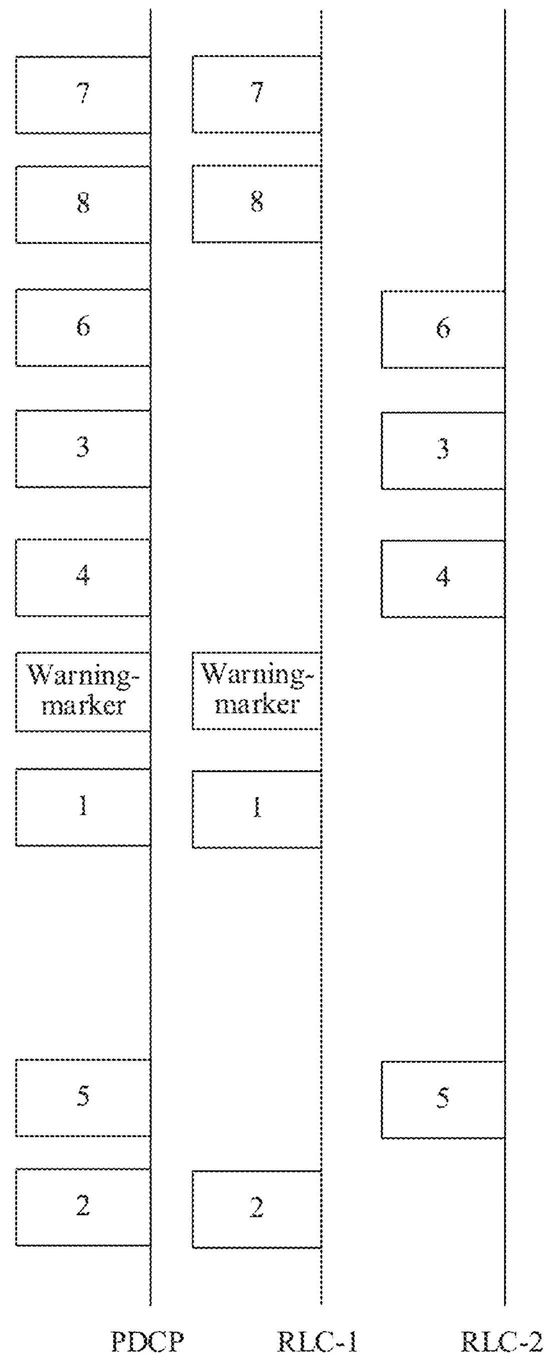
FIG. 14 is another schematic diagram of receiving, by a terminal device, a packet sent by an access network device according to an embodiment of the present invention.

As shown in FIG. 14, before the terminal device receives a warning-marker sent by the source access network device, if No. 2 and No. 1 packets are received from the source access network device, the No. 2 and No. 1 packets may be determined as first-type packets. Before the terminal device receives a warning-marker sent by the source access network device, if a No. 5 packet is received from the target access network device, the No. 5 packet may be determined as a first-type packet. After the terminal device receives the warning-marker sent by the source terminal device, a COUNT value of a first packet in the second-type packets that is determined based on the warning-marker is 6. After the terminal device receives the warning-marker, No. 4, No. 3, and No. 6 packets are received from the target access network device, and it may be determined that the No. 4 and No. 3 packets in packets whose COUNT values are respectively 4, 3, and 6 are first-type packets, and the No. 6 packet whose COUNT value is 6 is a second-type packet. After the terminal device receives the warning-marker, No. 8 and No. 7 packets from the source access network device are received, it may be determined that the No. 8 and No. 7 packets whose COUNT values are respectively 8 and 7 are second-type packets.

It should be noted that before the terminal device receives the first indication information, a received packet is deciphered by using a first cipher key, the terminal device receives packets enciphered by using two types of keys within a period of time after the primary and secondary access network devices exchange roles. The terminal device may perform key reconfiguration in the following two modes. Mode 1: The terminal device may adopt a manner of flexibly configuring two types of keys. That is, if a type of a packet received by the terminal device previously is different from that of a packet received currently, key reconfiguration needs to be performed. For example, if a packet received by the terminal device previously is a first-type packet, and a packet received currently is a second-type packet, the terminal device needs to perform key reconfiguration, and configure a cipher key in the PDCP entity as a second cipher key. Alternatively, if a packet received by the terminal device previously is a second-type packet, and a packet received currently is a first-type packet, the terminal device needs to perform key reconfiguration, and configure a cipher key in the PDCP entity as a first cipher key. In this mode, each time the terminal device receives a packet of a specific type, the terminal device needs to perform key reconfiguration once. A beneficial effect of this mode is fully using time resources to decipher the second-type packet as soon as possible. Mode 2: The terminal device only performs key reconfiguration once. That is, before the terminal device receives all the first-type packets, if the terminal device receives a second-type packet, the second-type packet is temporarily not deciphered, and instead, the second-type packets is stored. After the terminal device receives and deciphers all the first-type packets, the terminal device performs key reconfiguration, configures a cipher key in the PDCP entity as a second cipher key, and further, deciphers the received second-type packet. A beneficial effect of this mode is reducing a time of dynamically configuring a key to help implementation.

Referring to FIG. 10, when the terminal device receives a No. 2 packet, the No. 2 packet may be deciphered by using a first cipher key. After a No. 6 packet is received, key reconfiguration may be performed once, that is, a cipher key in the PDCP entity is configured as a second cipher key, so that the No. 6 packet is deciphered by using the second cipher key. Subsequently, the terminal device further receives a No. 4 packet, key reconfiguration may be performed again, that is, the cipher key in the PDCP entity is configured as a first cipher key, so that the No. 4 packet is deciphered by using the first cipher key. Subsequently, the terminal device further receives a No. 8 packet, key reconfiguration may be performed again, that is, the cipher key in the PDCP entity is configured as a second cipher key, so that the No. 8 packet is deciphered by using the second cipher key. Alternatively, the terminal device may learn of, based on a start-marker, that an SN number of a last packet in the first-type packets is 5, and when receiving a No. 6 packet, the terminal device learns of that the first-type packets are not all received, that is, only No. 1, No. 5, No. 3, and No. 2 packets are received, and a No. 4 packet is not received, and the terminal device temporarily does not decipher the No. 6 packet, but temporarily stores the No. 6 packet. After the No. 4 packet is received and the No. 4 packet is deciphered by using the first cipher key, the terminal device performs key reconfiguration once, and configures the key in the PDCP entity as the second cipher key, and further, deciphers the received No. 6 packet.

Referring to FIG. 11, when the terminal device receives a No. 4 packet sent by the target access network device, the No. 4 packet may be deciphered by using a first cipher key. When a start-marker sent by the target access network device is received, an SN number of a first packet in the second-type packets learned of based on the start-marker is 6. Therefore, when a No. 1 packet sent by the source terminal device is received, the No. 1 packet is deciphered by continuously using the first cipher key. When receiving a No. 3 packet sent by the target access network device, the terminal device performs deciphering by continuously using the first cipher key. After a No. 6 packet sent by the target access network device is received, key reconfiguration may be performed once, that is, a cipher key in the PDCP entity is configured as a second cipher key, so that the No. 6 packet is deciphered by using the second cipher key. Subsequently, the terminal device receives an end-marker sent by the source access network device, and learns of, based on the end-marker, that the SN number of the last packet in the first-type packets is 5. Subsequently, when receiving the No. 8 packet sent by the source access network device again, the terminal device deciphers the No. 8 packet by using a second cipher key. Alternatively, before receiving the start-marker sent by the target access network device, the terminal device deciphers the received. No. 2, No. 5, and No. 4 packets by using the first cipher key. When a start-marker is received, an SN number of a first packet in the second-type packets learned based on the start-marker is 6. Therefore, when receiving a No. 6 packet, if the terminal device learns of that No. 1 to No. 5 packets before the No. 6 packet are all received, the terminal device deciphers No. 1 to No. 5 packets by using the first cipher key. After the deciphering, the terminal device performs key reconfiguration once, and configures the cipher key in the PDCP entity as the second cipher key, to decipher the received No. 6, No. 7, and No. 8 packets by using the second cipher key.

Optionally, after receiving the first indication information sent by the access network device, the terminal device sends an acknowledgment message of the first indication information to the access network device.

Optionally, the acknowledgment message is indicated by the terminal device by using a PDCP state report or a control PDU of the PDCP, The control PDU carries an SN number or a COUNT value of the first indication information, so that after receiving the control PDU, the access network device can conveniently learn of, based on the SN number or the COUNT value of the first indication information carried in the control PDU, that the first indication information has been correctly received by the terminal device.

Through implementation of this embodiment of the present invention, the access network device sends first indication information to the terminal device, the first indication information may indicate a last packet in one or more first-type packets or a first packet in one or more second-type packets, and after receiving the first indication information, the terminal device may identify whether a received packet is a first-type packet or a second-type packet with reference to the first indication information. Therefore, the received packet may be deciphered by using a correct key.

Figure 15:
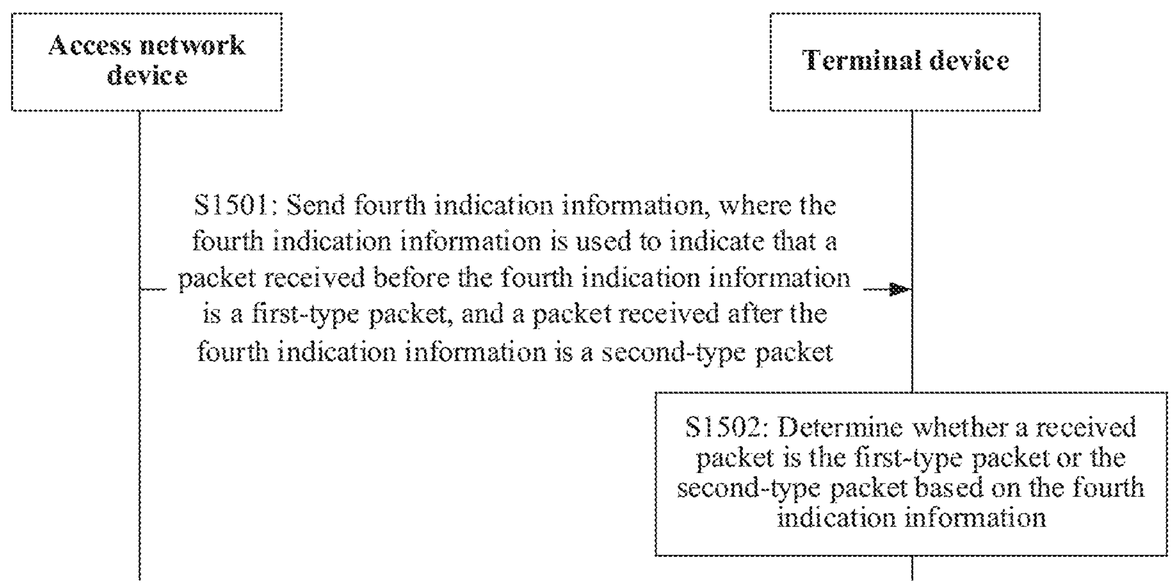
FIG. 15 is a schematic flowchart of another data transmission method according to an embodiment of the present invention.

Based on a network architecture shown in FIG. 2, another data transmission method provided in this embodiment of the present invention is described with reference to FIG. 15. As shown in FIG. 15, the data transmission method includes, but is not limited to, the following steps S1501 to S1502:

S1501: An access network device sends fourth indication information to a terminal device, where the fourth indication information is used to indicate that a packet received before the fourth indication information is a first-type packet, and a packet received after the fourth indication information is a second-type packet.

In this embodiment of the present invention, the first-type packet is obtained through enciphering by using a first cipher key, and the second-type packet is obtained through enciphering by using a second cipher key. Specifically, the first-type packet is obtained by the source access network device through enciphering by using the first cipher key, and the second-type packet is obtained by the target access network device through enciphering by using the second cipher key.

Optionally, in this embodiment of the present invention, an RLC entity of the terminal device has a reordering function. Herein, the reordering function means that the RLC entity has a function of submitting packets orderly to a PDCP entity, Optionally, the access network device described in step S1501 may be a source access network device, or a target access network device. Before the source access network device and the target access network device exchange roles, after the source access network device generates the fourth indication information, the fourth indication information may be sent to the terminal device through an air interface channel between the source access network device and the terminal device. The source access network device may alternatively send the fourth indication information to the target access network device, to send the fourth indication information through an air interface channel between the target access network device and the terminal device to the terminal device.

Optionally, before the access network device sends the fourth indication information to the terminal device, the access network device sends a Radio Resource Control (Radio Resource Control, RRC) reconfiguration message to the terminal device. The terminal device receives the RRC reconfiguration message sent by the access network device, and enables the reordering function of the RLC entity.

Optionally, the fourth indication information is carried in a data. PDU or a control PDU. For implementations in which the fourth indication information is carried in a data PDU or a control PDU, refer to the implementations in which the first indication information is carried in a data PDU or a control PDU in the embodiment shown in FIG. 3, Details are not described herein again.

In an implementation, after master and secondary access network devices exchange roles, a PDCP entity of a split bearer is located in the target access network device, the second-type packets owe not transmitted through an RLC entity, a MAC entity, and a PHY entity of the source access network device any more, but are transmitted through an RLC entity, a MAC entity, and a PHY entity of the target access network device. To ensure that a time at which the fourth indication information is submitted by the RLC entity of the terminal device to the PDCP entity of the terminal device is earlier than a second-type packet and a subsequent second-type packet, the target access network device does not send the second-type packets to the terminal device before receiving an ACK message of the fourth indication information. As shown in FIG. 4, No. 1 to No. 5 packets are first-type packets, and No. 6 to No. 8 packets are second-type packets. After sending the No. 5 packet to the terminal device, the target access network device sends a start-marker to the terminal device. To ensure that the start-marker arrives at the PDCP entity of the terminal device before the No. 6 to No. 8 packets, that is, times at which the No. 6 packet and a subsequent packet are submitted by the RLC entity of the terminal device to the PDCP entity of the terminal device are later than the start-marker, the target access network device does not send No. 6 and No. 8 packets before receiving an ACK message of the start-marker returned by the terminal device.

In another implementation, after master and secondary access network devices exchange roles, a PDCP entity of a split bearer is located in the target access network device, the second-type packets may be transmitted through an RLC entity, a MAC entity, and a PHY entity of the source access network device, or may be transmitted through an RLC entity, a MAC entity, and a PHY entity of the target access network device. In this case, after the first-type packets are sent to the terminal device, the source access network device needs to send the fourth indication information to the terminal device. Then, the master and secondary access network devices exchange roles. In addition, after the first-type packets are sent to the terminal device, the target access network device also needs to send the fourth indication information to the terminal device. To ensure that a time at which the fourth indication information sent by the source access network device is submitted by the RLC entity of the terminal device to the PDCP entity of the terminal device is earlier than a second-type packet and a subsequent second-type packet, the source access network device does not send the second-type packets to the terminal device before receiving an ACK message of the fourth indication information. To ensure that a time at which the fourth indication information sent by the target access network device is submitted by the RLC entity of the terminal device to the PDCP entity of the terminal device is earlier than a second-type packet and a subsequent second-type packet, the target access network device does not send the second-type packets to the terminal device before receiving an ACK message of the fourth indication information. As shown in FIG. 7, No. 1 to No. 5 packets are first-type packets, and No. 6 to No. 8 packets are second-type packets. After sending the No. 1 packet to the terminal device, the source access network device sends an end-marker to the terminal device. To ensure that the end-marker arrives at the PDCP entity of the terminal device before the No. 8 and No. 7 packets, that is, times at which the No. 8 and No. 7 packets are submitted by the RLC entity of the terminal device to the PDCP entity of the terminal device are later than the end-marker, the target access network device does not send No. 8 and No. 7 packets before receiving the ACK message of the end-marker returned by the terminal device. Similarly, after sending the No. 4 packet to the terminal device, the target access network device sends a start-marker to the terminal device. To ensure that the start-marker arrives at the PDCP entity of the terminal device before the No. 6 packet, that is, times at which the No. 6 packet and a subsequent packet are submitted by the RLC entity of the terminal device to the PDCP entity of the terminal device are later than the start-marker, the target access network device does not send No. 6 packet before receiving the ACK message of the start-marker returned by the terminal device.

S1502: The terminal device receives the fourth indication information sent by the access network device and determines whether a received packet is the first-type packet or the second-type packet based on the fourth indication information.

Because the RLC entity of the terminal device has a reordering function, in this case, the fourth indication information may not carry SN information, and the terminal device determines whether the received packet is a first-type packet or a second-type packet based on a reception order of the received packet and the fourth indication information and an access network device that sends the packet. A packet received by the PDCP entity before the fourth indication information is determined as a first-type packet, and a packet received by the PDCP entity after the fourth indication information is determined as a second-type packet.

Figure 16:
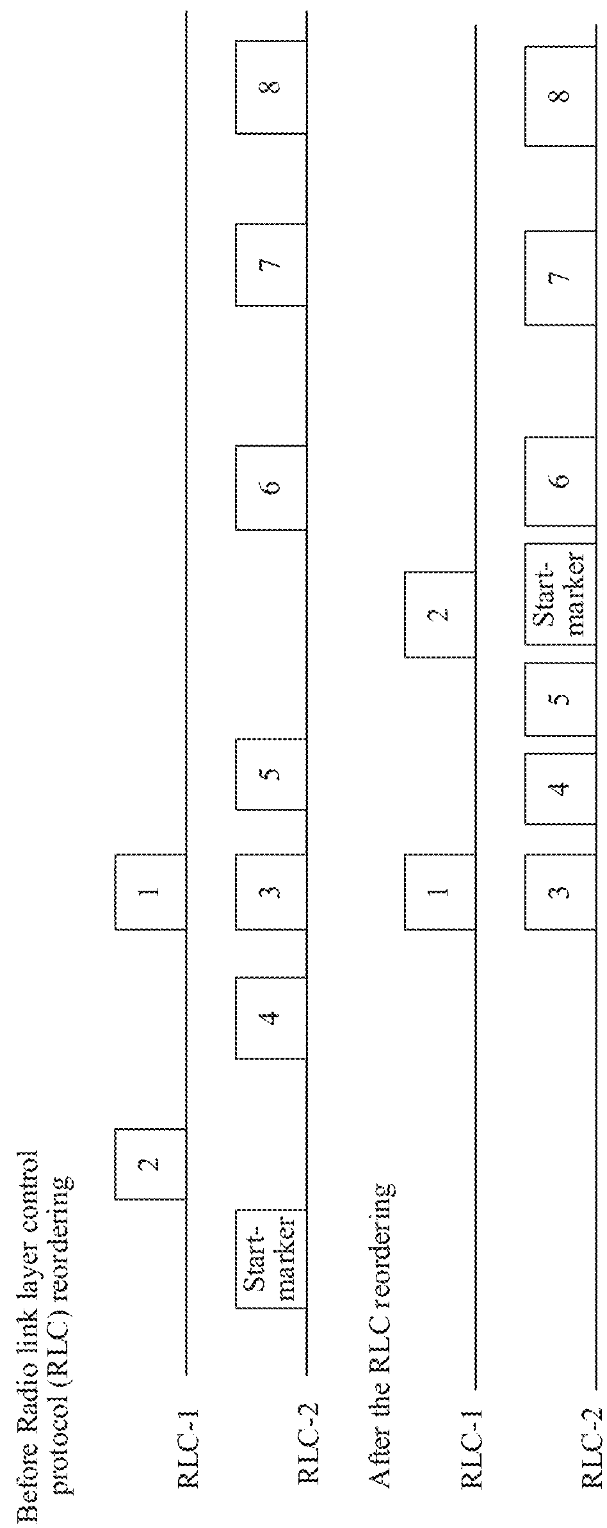
FIG. 16 is another schematic diagram of receiving, by a terminal device, a packet sent by an access network device according to an embodiment of the present invention.

In an implementation, referring to FIG. 16, No. 1 to No. 5 packets are first-type packets, and No. 6 to No. 8 packets are second-type packets. Orders of packets received by two RLC entities of the terminal device are respectively: RLC-1: 2, 1; and RLC-2: start-marker, 4, 3, 5, 6, 7, 8. The RLC entities of the terminal device reorder the received packets. That is, an order of SN numbers of packets in one RLC entity is recovered. After the reordering, orders of packets received by the two RLC entities of the terminal device are respectively: RLC-1: 1, 2; and RLC-2: 4, 3, 5, start-marker, 6, 7, 8. Therefore, the PDCP entity of the terminal device may determine, based on the access network devices that send the packets and the fourth indication information, that the No. 1 and No. 2 packets sent by the source access network device are first-type packets and that the No. 3, No. 4, and No. 5 packets sent by the target access network device before the start-marker are first-type packets and the No. 6 to No. 8 packets after the start-marker are second-type packets.

Figure 17:
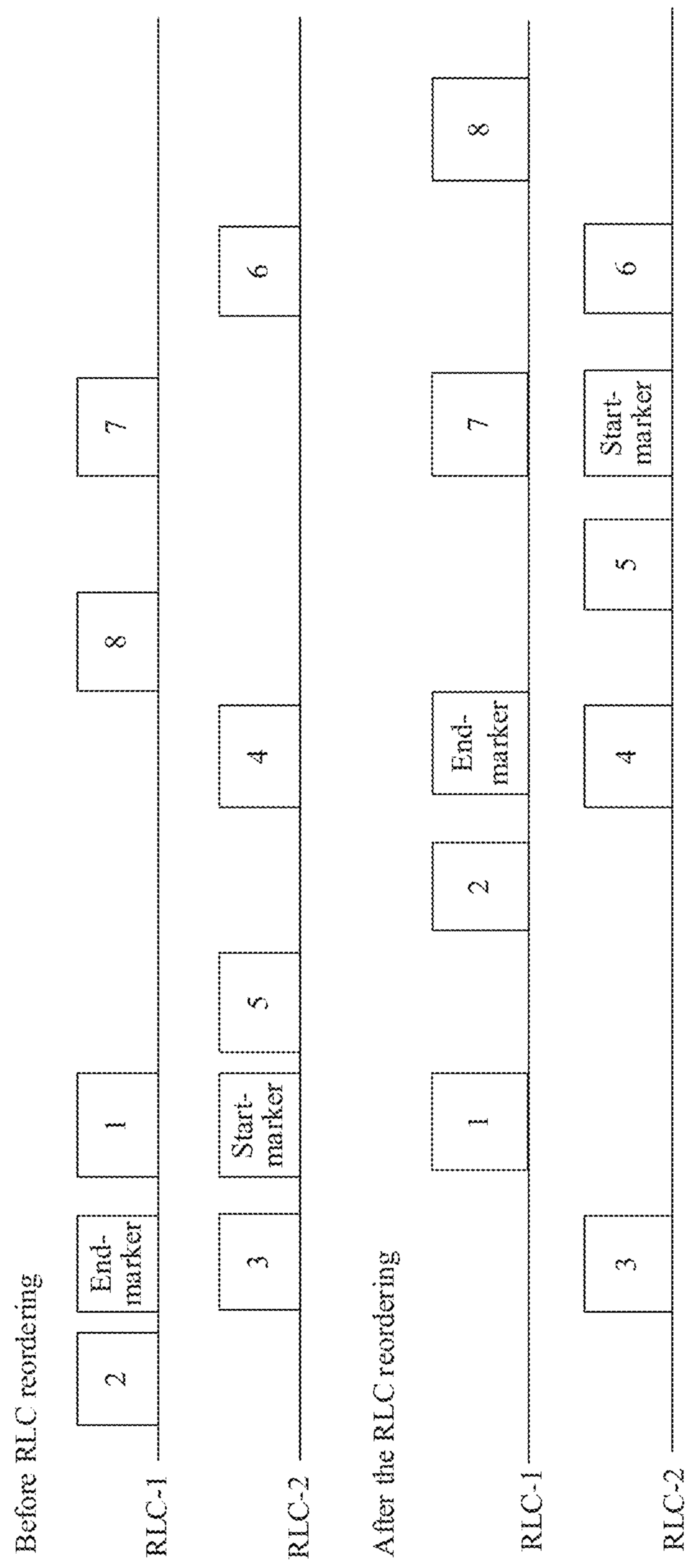
FIG. 17 is another schematic diagram of receiving, by a terminal device, a packet sent by an access network device according to an embodiment of the present invention.

In another implementation, referring to FIG. 17, No. 1 to No. 5 packets are first-type packets, and No. 6 to No. 8 packets are second-type packets. Orders of packets received by two RLC entities of the terminal device are respectively: RLC-1: 2, end-marker, 1, 8, 7; and RLC-2: 3, start-marker, 5, 4, 6. The RLC entities of the terminal device reorder the received packets. That is, an order of SN numbers of packets in one RIX entity is recovered. After the reordering, orders of packets received by the two RLC entities of the terminal device are respectively: RLC-1: 1, 2, end-marker, 7, 8; and RLC-2: 4, 3, 5, start-marker, 6. Therefore, the PDCP entity of the terminal device may determine, based on the corresponding access network devices that send the packets and the fourth indication information, that the No. 1 and No. 2 packets sent by the source access network device before the end-marker are first-type packets and the No. 7 and No. 8 packets after the end-marker are second-type packets, and that the No. 3, No. 4, and No. 5 packets sent by the target access network device before the start-marker are first-type packets and the No. 6 packet after the start-marker is second-type packets.

After determining the first-type packets, the PDCP entity of the terminal device deciphers the first-type packets by using the first cipher key. After determining the second-type packets, the PDCP entity of the terminal device deciphers the second-type packets by using the second cipher key.

Through implementation of this embodiment of the present invention, the access network device sends fourth indication information to the terminal device, where the fourth indication information is used to indicate that a packet received before the fourth indication information is a first-type packet, and a packet received after the fourth indication information is a second-type packet. After receives packets that are out of order, the RCL entities of the terminal device can reorder the packets that are out of order to recover an original order of the received packets. After receiving the fourth indication information, the PDCP entities of the terminal device may identify whether a received packet is a first-type packet or a second-type packet with reference to the fourth indication information. Therefore, the received packet may be deciphered by using a correct key.

To facilitate implementation of the embodiments of the present invention, the present invention provides an access network device and a terminal device that are configured to perform the data transmission method provided in the embodiments of the present invention.

Figure 18:
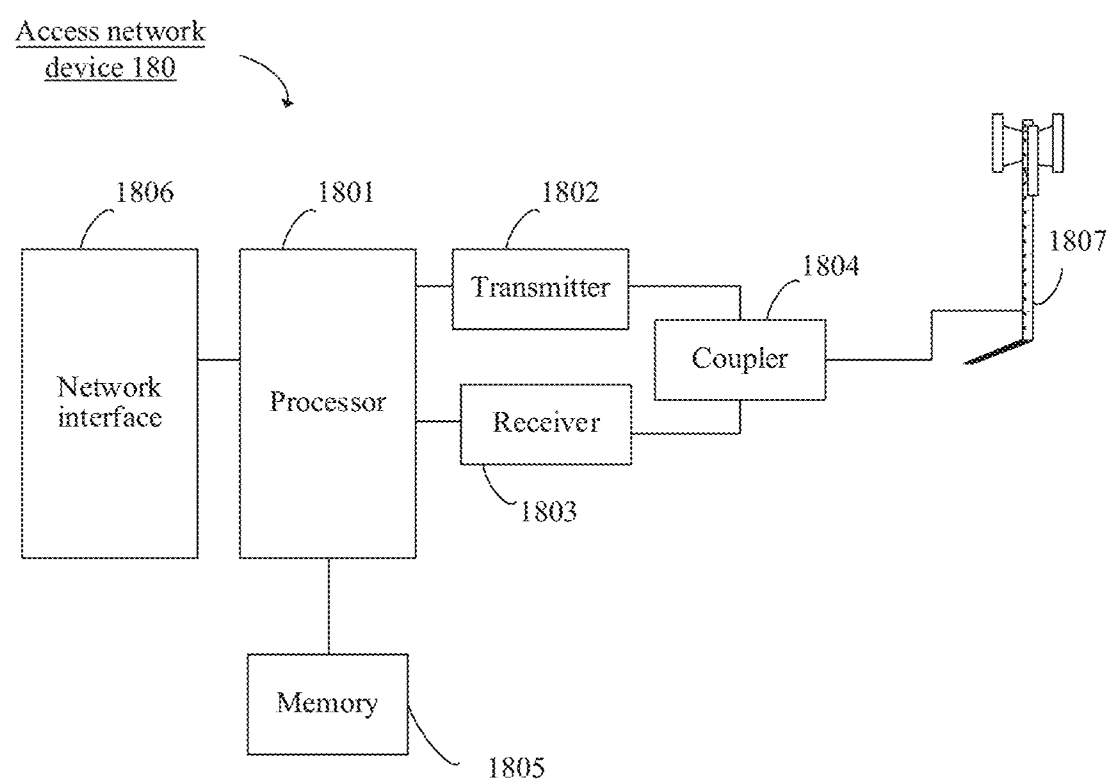
FIG. 18 is a schematic structural diagram of an access network device according to an embodiment of the present invention.

Referring to FIG. 18, an access network device 180 may include: a processor 1801, a transmitter 1802, a receiver 1803, a coupler 1804, a memory 1805, a network interface 1806, and an antenna 1807. The components may be connected through a bus or in another manner. In FIG. 18, an example in which the components are connected through a bus is used.

The network interface 1806 is configured for the access network device 180 to perform data communication with a terminal device. In a specific implementation, the access network device 180 may include one or more of a GSM (2G) wireless network interface, a WCDMA (3G) wireless network interface, an LTE (4G) wireless network interface, and the like, or may be a future 5G wireless network interface.

The antenna 1807 is configured to convert electromagnetic energy in a transmission line into electromagnetic waves in free space or convert electromagnetic waves in free space into electromagnetic energy in a transmission line. The coupler 1804 is configured to divide a mobile communication signal into a plurality of signals and allocate them to a plurality of receivers 1803.

The transmitter 1802 is configured to perform transmission processing (for example, modulation) on the mobile communication signal generated by the processor 1801, the receiver 1803 is configured to perform reception processing (for example, demodulation) on the mobile communication signal received by the antenna 1807, and the two may be considered as a wireless modem. In a specific implementation, there may be one or more transmitters 1802 or receivers 1803.

The memory 1805 is configured to store program code and data. In a specific implementation, the memory 1805 may be a read-only memory (Read-Only Memory, ROM) or a random access memory (Random Access Memory, RAM).

In a first solution of this embodiment of the present invention, The processor 1801 is configured to invoke the program code stored in the memory 1805, to perform the following operations:

sending first indication information to a terminal device through the transmitter 1802, where the first indication information is used to indicate a last packet in one or more first-type packets or a first packet in one or more second-type packets, the first-type packet is enciphered by using a first cipher key, and the second-type packet is enciphered by using a second cipher key.

Optionally, the first indication information includes at least one type of the following information: a number corresponding to the last packet in the first-type packets, a number corresponding to the first packet in the second-type packets, a difference between the number corresponding to the last packet in the first-type packets and an offset, and a difference between the number corresponding to the first packet in the second-type packets and an offset.

Optionally, after the processor 1801 sends the first indication information to the terminal device through the transmitter 1802, the processor 1801 is further configured to: after the receiver 1803 receives an acknowledgment message of the first indication information sent by the terminal device, send the second-type packet to the terminal device through the transmitter 1802.

Optionally, that the processor 1801 sends the first indication information to the terminal device through the transmitter 1802 includes:

after sending all the first-type packets to the terminal device, sending the first indication information to the terminal device.

Optionally, the access network device 180 is a first access network device, the first-type packet is obtained by the first access network device through enciphering by using the first cipher key, and the second-type packet is obtained by the second access network device through enciphering by using the second cipher key; and after receiving the acknowledgment message of the first indication information sent by the terminal device, the processor 1801 sends second indication information to the second access network device through the transmitter 1802, where the second indication information is used to instruct the second access network device to send the second-type packet.

Optionally, the first indication information is carried in a data protocol data unit or a control protocol data unit; or that the processor 1801 sends the first indication information to the terminal device through the transmitter 1802 includes:

sending the first indication information to the terminal device by using a data protocol data unit or a control protocol data unit.

Optionally, the data protocol data unit includes third indication information, the third indication information is used to indicate that the first indication information is carried in the data protocol data unit, and a number of the data protocol data unit is the number indicated by the first indication information.

It should be noted that for functions of functional devices in the access network device 180 described in this embodiment of the present invention, refer to related descriptions on the corresponding access network device in the embodiment shown in FIG. 3. Details are not described herein again.

In a second solution of this embodiment of the present invention, the processor 1801 is configured to invoke the program code stored in the memory 1805, to perform the following operations:

sending fourth indication information to a terminal device through the transmitter 1802, where the fourth indication information is used to indicate that a packet received before the fourth indication information is a first-type packet, a packet received after the fourth indication information is a second-type packet, the first-type packet is obtained through enciphering by using a first cipher key, and the second-type packet is obtained through enciphering by using a second cipher key.

Optionally, a radio link layer control protocol entity of the terminal device has a reordering function.

Optionally, before the processor 1801 sends the fourth indication information to the terminal device through the transmitter 1802, the processor 1801 is further configured to: send a Radio Resource Control reconfiguration message to the terminal device through the transmitter 1802, where the Radio Resource Control reconfiguration message is used to instruct the terminal device to enable the reordering function of the radio link layer control protocol entity.

Optionally, the fourth indication information is carried in a data protocol data unit or a control protocol data unit.

It should be noted that for functions of functional modules in the access network device 180 described in this embodiment of the present invention, refer to related descriptions on the corresponding access network device in the embodiment shown in FIG. 15. Details are not described herein again.

Figure 19:
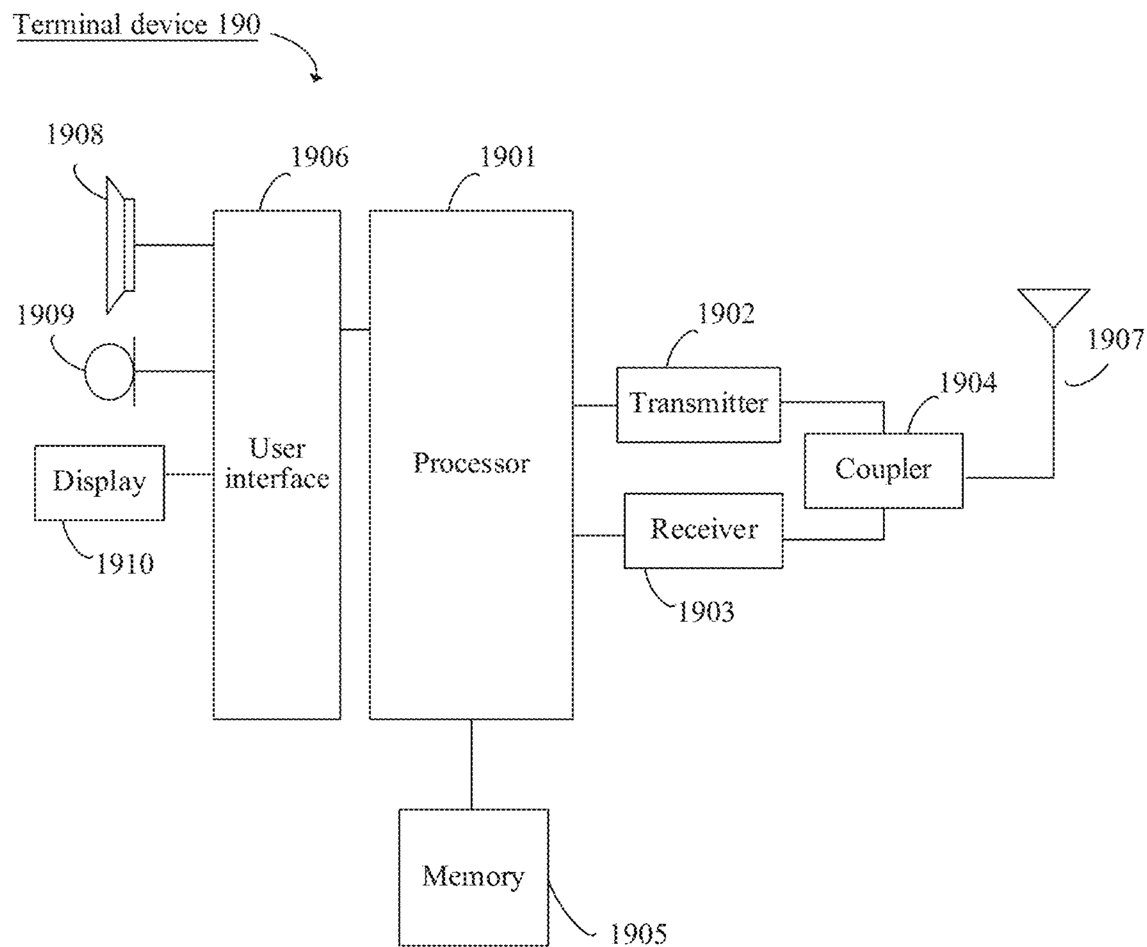
FIG. 19 is a schematic structural diagram of a terminal device according to an embodiment of the present invention.

Referring to FIG. 19, the terminal device 190 may include: an input/output module (including an audio input/output module 1908, a key input module 1909, a display 1910, and the like), a user interface 1906, a processor 1901, a transmitter 1902, a receiver 1903, a coupler 1904, an antenna 1907, and a memory 1905. The components may be connected through a bus or in another manner. In FIG. 19, an example in which the components are connected through a bus is used.

In the example:

The antenna 1907 is configured to convert electromagnetic energy in a transmission line into electromagnetic waves in free space or convert electromagnetic waves in free space into electromagnetic energy in a transmission line. The coupler 1904 is configured to divide a mobile communication signal into a plurality of signals and allocate them to a plurality of receivers 1903.

The transmitter 1902 is configured to perform transmission processing (for example, modulation) on the mobile communication signal generated by the processor 1901, the receiver 1903 is configured to perform reception processing (for example, demodulation) on the mobile communication signal received by the antenna 1907, and the two may be considered as a wireless modem. In a specific implementation, there may be one or more transmitters 1902 or receivers 1903.

The input/output module is mainly configured to implement an interaction function between the terminal device 190 and a user/an external environment, and mainly includes an audio input/output module 1908, a key input module 1909, a display 1910, and the like. In a specific implementation, the input/output module may further include: a camera, a touchscreen, a sensor, and the like. The input/output modules all communicate with the processor 1901 through the user interface 1906.

The memory 1905 is coupled to the processor 1901 and is configured to store various software programs and/or a plurality of sets of instructions. In a specific implementation, the memory 1905 may include a high-speed random access memory, and may also include a nonvolatile memory, for example, one or more magnetic storage devices, flash memory devices, or other nonvolatile solid-state storage devices.

In a first solution of this embodiment of the present invention, the processor 1901 is configured to invoke the program code and data stored in the memory 1905, to perform the following operations:

receiving, through the receiver 1903, first indication information sent by an access network device, where the first indication information is used to indicate a last packet in one or more first-type packets and a first packet in one or more second-type packets, the first-type packet is enciphered by using a first cipher key, and the second-type packet is enciphered by using a second cipher key; and determining that a received packet is the first-type packet or the second-type packet based on the first indication information.

Optionally, the first indication information includes at least one type of the following information: a number corresponding to the last packet in the first-type packets, a number corresponding to the first packet in the second-type packets, a difference between the number corresponding to the last packet in the first-type packets and an offset, and a difference between the number corresponding to the first packet in the second-type packets and an offset.

Optionally, after the processor 1901 receives, through the receiver 1903, the first indication information sent by the access network device, the processor 1901 is further configured to: send an acknowledgment message of the first indication information to the access network device through the transmitter 1902.

Optionally, the acknowledgment message is indicated by the terminal device by using a packet data convergence protocol state report or is sent by the terminal device by using a control protocol data unit of the packet data convergence protocol, and the control protocol data unit carries the number indicated by the first indication information.

Optionally, the first indication information is carried in a data protocol data unit or a control protocol data unit.

Optionally, the data protocol data unit further carries third indication information, the third indication information is used to indicate that the first indication information is carried in the data protocol data unit, and a number of the data protocol data unit is the number indicated by the first indication information.

It should be noted that for functions of functional modules in the terminal device 190 described in this embodiment of the present invention, refer to related descriptions on the corresponding terminal device in the embodiment shown in FIG. 3. Details are not described herein again.

In a second solution of this embodiment of the present invention, the processor 1901 is configured to invoke the program code and data stored in the memory 1905, to perform the following operations: receiving, through the receiver 1903, fourth indication information sent by an access network device, where the fourth indication information is used to indicate that a packet received before the fourth indication information is a first-type packet, a packet received after the fourth indication information is a second-type packet, the first-type packet is obtained through enciphering by using a first cipher key, and the second-type packet is obtained through enciphering by using a second cipher key; and determining that a received packet is the first-type packet or the second-type packet based on the fourth indication information.

Optionally, a radio link layer control protocol entity of the terminal device 190 has a reordering function.

Optionally, before the processor 1901 receives the fourth indication information sent by the access network device through the receiver 1903, the processor 1901 is further configured to:

receive, through the receiver 1903, a Radio Resource Control reconfiguration message sent by the access network device; and enable a reordering function of the radio link layer control protocol entity based on the Radio Resource Control reconfiguration message.

Optionally, the fourth indication information is carried in a data protocol data unit or a control protocol data unit.

It should be noted that for functions of functional modules in the terminal device 190 described in this embodiment of the present invention, refer to related descriptions on the corresponding terminal device in the embodiment shown in FIG. 15. Details are not described herein again.

Figure 20:
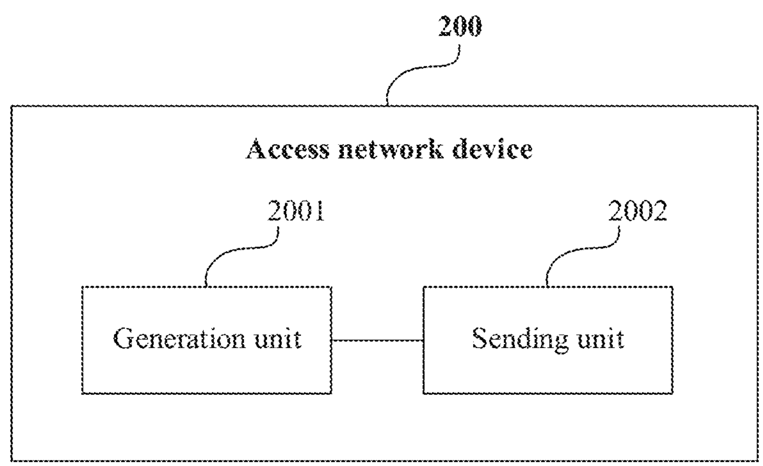
FIG. 20 is a schematic structural diagram of another access network device according to an embodiment of the present invention.

FIG. 20 is a schematic structural diagram of another access network device according to an embodiment of the present invention. As shown in FIG. 20, an access network device 200 includes: a generation unit 2001 and a sending unit 2002.

In a first solution of this embodiment of the present invention, the generation unit 2001 is configured to generate first indication information, where the first indication information is used to indicate a last packet in one or more first-type packets or a first packet in one or more second-type packets, the first-type packet is enciphered by using a first cipher key, and the second-type packet is enciphered by using a second cipher key.

The sending unit 2002 is configured to send the first indication information to the terminal device.

Optionally, the first indication information includes at least one type of the following information: a number corresponding to the last packet in the first-type packets, a number corresponding to the first packet in the second-type packets, a difference between the number corresponding to the last packet in the first-type packets and an offset, and a difference between the number corresponding to the first packet in the second-type packets and an offset.

Optionally, after the sending unit 2001 sends the first indication information to the terminal device, the sending unit 2001 is further configured to: after the access network device 200 receives an acknowledgment message of the first indication information sent by the terminal device, send the second-type packet to the terminal device.

Optionally, the sending unit 2002 sends the first indication information to the terminal device, specifically including:

after sending all the first-type packets to the terminal device, sending the first indication information to the terminal device.

Optionally, the access network device 200 is a first access network device, the first-type packet is obtained by the access network device 200 through enciphering by using the first cipher key, and the second-type packet is obtained by the second access network device through enciphering by using the second cipher key; and after the access network device 200 receives an acknowledgment message of the first indication information sent by the terminal device, the sending unit 2002 is further configured to send second indication information to the second access network device, where the second indication information is used to instruct the second access network device to send the second-type packet.

Optionally, the first indication information is carried in a data protocol data unit or a control protocol data unit; or the sending unit 2002 sends the first indication information to the terminal device, specifically including:

sending the first indication information to the terminal device by using a data protocol data unit or a control protocol data unit.

Optionally, the data protocol data unit includes third indication information, the third indication information is used to indicate that the first indication information is carried in the data protocol data unit, and a number of the data protocol data unit is the number indicated by the first indication information.

It should be noted that for functions of functional modules in the access network device 200 described in this embodiment of the present invention, refer to related descriptions on the corresponding access network device in the embodiment shown in FIG. 3. Details are not described herein again.

In a second solution of this embodiment of the present invention, a generation unit 2001 is configured to generate fourth indication information, where the fourth indication information is used to indicate that a packet received before the fourth indication information is a first-type packet, a packet received after the fourth indication information is a second-type packet, the first-type packet is obtained through enciphering by using a first cipher key, and the second-type packet is obtained through enciphering by using a second cipher key.

A sending unit 2002 is configured to send the fourth indication information to the terminal device.

Optionally, a radio link layer control protocol entity of the terminal device has a reordering function.

Optionally, before the sending unit 2002 sends the fourth indication information to the terminal device, the sending unit 2002 is further configured to: send a Radio Resource Control reconfiguration message to the terminal device, where the Radio Resource Control reconfiguration message is used to instruct the terminal device to enable the reordering function of the radio link layer control protocol entity.

Optionally, the fourth indication information is carried in a data protocol data unit or a control protocol data unit.

It should be noted that for functions of functional units in the access network device 200 described in this embodiment of the present invention, refer to related descriptions on the corresponding access network device in the embodiment shown in FIG. 15. Details are not described herein again.

Figure 21:
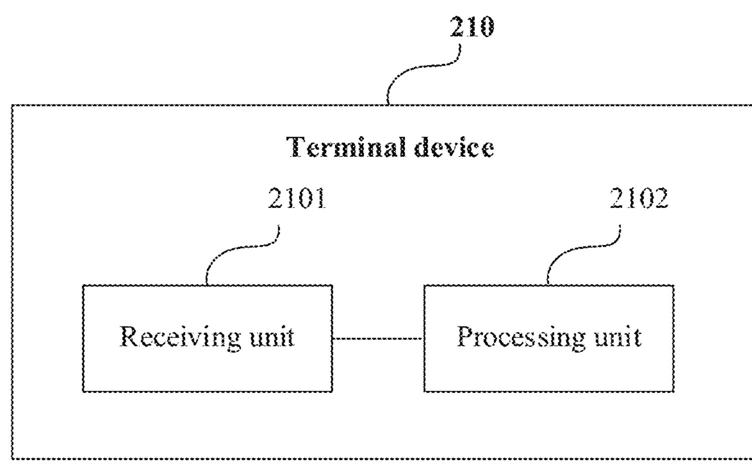
FIG. 21 is a schematic structural diagram of another terminal device according to an embodiment of the present invention.

FIG. 21 is a schematic structural diagram of a terminal device according to an embodiment of the present invention. As shown in FIG. 21, a terminal device 210 includes: a receiving unit 2101 and a processing unit 2102.

In a first solution of this embodiment of the present invention, the receiving unit 2101 is configured to receive first indication information sent by an access network device, where the first indication information is used to indicate a last packet in one or more first-type packets and a first packet in one or more second-type packets, the first-type packet is enciphered by using a first cipher key, and the second-type packet is enciphered by using a second cipher key.

The processing unit 2010 is configured to determine whether a received packet is the first-type packet or the second-type packet based on the first indication information.

Optionally, the first indication information includes at least one type of the following information: a number corresponding to the last packet in the first-type packets, a number corresponding to the first packet in the second-type packets, a difference between the number corresponding to the last packet in the first-type packets and an offset, and a difference between the number corresponding to the first packet in the second-type packets and an offset.

Optionally, the terminal device 210 further includes: a sending unit 2103, where after the receiving unit 2101 receives first indication information sent by an access network device, the sending unit is configured to send an acknowledgment message of the first indication information to the access network device.

Optionally, the acknowledgment message is indicated by the terminal device by using a packet data convergence protocol state report or is sent by the terminal device by using a control protocol data unit of the packet data convergence protocol, and the control protocol data unit carries the number indicated by the first indication information.

Optionally, the first indication information is carried in a data protocol data unit or a control protocol data unit.

Optionally, the data protocol data unit further carries third indication information, the third indication information is used to indicate that the first indication information is carried in the data protocol data unit, and a number of the data protocol data unit is the number indicated by the first indication information.

It should be noted that for functions of functional modules in the terminal device 210 described in this embodiment of the present invention, refer to related descriptions on the corresponding terminal device in the embodiment shown in FIG. 3. Details are not described herein again.

In a second solution of this embodiment of the present invention, the receiving unit 2101 is configured to receive fourth indication information sent by an access network device, where the fourth indication information is used to indicate that a packet received before the fourth indication information is a first-type packet, a packet received after the fourth indication information is a second-type packet, the first-type packet is obtained through enciphering by using a first cipher key, and the second-type packet is obtained through enciphering by using a second cipher key.

The processing unit 2010 is configured to determine whether a received packet is the first-type packet or the second-type packet based on the fourth indication information.

Optionally, a radio link layer control protocol entity of the terminal device 210 has a reordering function.

Optionally, before the receiving unit 2101 receives fourth indication information sent by an access network device, the receiving unit 2101 is further configured to receive a Radio Resource Control reconfiguration message sent by the access network device.

The processing unit 2102 is further configured to enable a reordering function of the radio link layer control protocol entity based on the Radio Resource Control reconfiguration message.

Optionally, the fourth indication information is carried in a data protocol data unit or a control protocol data unit.

It should be noted that for functions of functional units in the terminal device 210 described in this embodiment of the present invention, refer to related descriptions on the corresponding terminal device in the embodiment shown in FIG. 15. Details are not described herein again.

The methods or algorithm steps described in this application may be implemented in a hardware manner, or may be implemented in a manner of executing a software instruction by a processor. The software instruction may include a corresponding software module. The software module may be stored in a RAM, a flash memory, a ROM, an erasable programmable read only memory (Erasable Programmable ROM, EPROM), an electrically erasable programmable read only memory (Electrically EPROM, EEPROM for short), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a master access network device or a secondary access network device. Certainly, the processor and the storage medium may exist in a master access network device or a secondary access network device as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementation manners of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A data transmission method implemented by a first access network device, comprising:

obtaining a plurality of first-type packets using a first cipher key;

obtaining first indication information; and sending the first indication information to a terminal device, wherein the first indication information indicates a last packet in the first-type packets or a first packet in a plurality of second-type packets, and wherein the second-type packets are enciphered with a second cipher key.

2. The data transmission method of claim 1, wherein the first indication information comprises:

a first number corresponding to the last packet in the first-type packets;

a second number corresponding to the first packet in the second-type packets;

a first difference between the first number and a first offset; or a second difference between the second number and a second offset.

3. The data transmission method of claim 1, wherein after sending the first indication information, the data transmission method further comprises:

receiving an acknowledgment message of the first indication information from the terminal device; and sending the second-type packets to the terminal device.

4. The data transmission method of claim 1, wherein before sending the first indication information, the data transmission method further comprises:

sending all the first-type packets to the terminal device; and sending the first indication information to the terminal device.

5. The data transmission method of claim 1, further comprising:

receiving an acknowledgment message of the first indication information from the terminal device; and sending second indication information to the second access network device, wherein the second indication information instructs the second access network device to send the second-type packets.

6. The data transmission method of claim 1, further comprising receiving a data protocol data unit or a control protocol data unit carrying the first indication information.

7. The data transmission method of claim 6, wherein the data protocol data unit comprises third indication information, wherein the third indication information indicates that the first indication information is carried in the data protocol data unit, and wherein a number of the data protocol data unit is indicated by the first indication information.

8. The data transmission method of claim 1, further comprising sending the first indication information to the terminal device using a data protocol data unit or a control protocol data unit.

9. The data transmission method of claim 8, wherein the data protocol data unit comprises third indication information, wherein the third indication information indicates that the first indication information is carried in the data protocol data unit, and wherein the first indication information indicates a number of the data protocol data unit.

10. A data transmission method implemented by a terminal device, comprising:

receiving first indication information from a first access network device, wherein the first indication information indicates a last packet in a plurality of first-type packets or a first packet in a plurality of second-type packets, wherein the first-type packets are enciphered with a first cipher key, and wherein the second-type packets are enciphered with a second cipher key; and determining whether a received packet is of the first-type packets or the second-type packets based on the first indication information.

11. The data transmission method of claim 10, wherein the first indication information comprises:

a first number corresponding to the last packet in the first-type packets;

a second number corresponding to the first packet in the second-type packets;

a first difference between the first number and a first offset; or a second difference between the second number and a second offset.

12. The data transmission method of claim 10, wherein after receiving the first indication information, the data transmission method further comprises sending an acknowledgment message of the first indication information to the first access network device.

13. The data transmission method of claim 12, further comprising indicating the acknowledgment message using a packet data convergence protocol state report.

14. The data transmission method of claim 12, further comprising sending the acknowledgment message using a control protocol data unit of a packet data convergence protocol, wherein the control protocol data unit carries a number indicated by the first indication information.

15. The data transmission method of claim 10, further comprising receiving the first indication information in a data protocol data unit or a control protocol data unit.

16. The data transmission method of claim 15, wherein the data protocol data unit further carries third indication information, wherein the third indication information indicates that the first indication information is carried in the data protocol data unit, and wherein a number of the data protocol data unit is indicated by the first indication information.

17. A data transmission method implemented by a first access network device, comprising:

obtaining first indication information, wherein the first indication information indicates that a last packet received by a terminal device before the first indication information is a first-type packet and a first packet received after the first indication information is a second-type packet, wherein the first-type packet is enciphered with a first cipher key, and wherein the second-type packet is enciphered with a second cipher key; and sending the first indication information to the terminal device.

18. The data transmission method of claim 17, wherein a radio link layer control protocol entity of the terminal device has a reordering function.

19. The data transmission method of claim 18, wherein before sending the first indication information, the data transmission method further comprises sending a Radio Resource Control reconfiguration message to the terminal device, and wherein the Radio Resource Control reconfiguration message instructs the terminal device to enable the reordering function.

20. The data transmission method of claim 17, further comprising receiving a data protocol data unit or a control protocol data unit carrying first indication information.

* * * * *